(12) United States Patent
Grim, III et al.

(10) Patent No.: US 9,105,298 B2
(45) Date of Patent: Aug. 11, 2015

(54) DIGITAL LIFE RECORDER WITH SELECTIVE PLAYBACK OF DIGITAL VIDEO

(75) Inventors: Clifton E. Grim, III, Seabrook, TX (US); Rex Edward Marzke, Houston, TX (US); Gary A. Ward, Seabrook, TX (US); John David Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 12/277,873

(22) Filed: Nov. 25, 2008

(65) Prior Publication Data

US 2009/0175599 A1    Jul. 9, 2009

Related U.S. Application Data

(63) Continuation-in-part of application No. 11/968,772, filed on Jan. 3, 2008, now Pat. No. 8,014,573.

(51) Int. Cl.
| | |
|---|---|
| *H04N 5/765* | (2006.01) |
| *G11B 27/034* | (2006.01) |
| *G11B 27/10* | (2006.01) |
| *G11B 27/34* | (2006.01) |

(52) U.S. Cl.
CPC ............ *G11B 27/034* (2013.01); *G11B 27/105* (2013.01); *G11B 27/34* (2013.01)

(58) Field of Classification Search
USPC ...................................... 386/200, 248, E5.007
See application file for complete search history.

(56) References Cited

U.S. PATENT DOCUMENTS

| | | | |
|---|---|---|---|
| 6,049,787 A | 4/2000 | Takahashi et al. | |
| 6,301,370 B1 | 10/2001 | Steffens et al. | |
| 6,578,014 B1 | 6/2003 | Murcko, Jr. | |
| 6,778,968 B1 | 8/2004 | Gulati | |
| 6,816,842 B1 | 11/2004 | Singh et al. | |
| 6,825,875 B1 * | 11/2004 | Strub et al. | ............... 348/207.99 |
| 6,947,911 B1 | 9/2005 | Moritsu et al. | |
| 6,975,346 B2 | 12/2005 | Kumhyr | |

(Continued)

FOREIGN PATENT DOCUMENTS

| | | |
|---|---|---|
| EP | 1475967 A1 | 11/2004 |
| JP | 2002297893 | 10/2002 |
| WO | WO99/49656 | 9/1999 |

OTHER PUBLICATIONS

USPTO Final Office Action for U.S. Appl. No. 12/347,156 dated Oct. 14. 2010.

(Continued)

*Primary Examiner* — Thai Tran
*Assistant Examiner* — Girumsew Wendmagegn
(74) *Attorney, Agent, or Firm* — Yee & Associates, P.C.; John R. Pivnichny

(57) ABSTRACT

A method and apparatus for controlling the playback of video recorded by a sensing subsystem of a digital life recorder. The process identifies a selected video feed recorded by a camera of a sensing subsystem responsive to receiving user input. A segment of video from the selected video feed is identified using a personal computing device communicating with a digital life recorder. The digital life recorder records the selected video feed. A playback restriction associated with the segment of video is identified and generates a set of commands for restricting playback of the segment of video. A processor may then execute the set of commands.

23 Claims, 28 Drawing Sheets

(56) References Cited

U.S. PATENT DOCUMENTS

| | | | |
|---|---|---|---|
| 7,024,681 B1 | 4/2006 | Fransman et al. | |
| 7,062,472 B2 | 6/2006 | Dan et al. | |
| 7,080,405 B2 | 7/2006 | Himmel et al. | |
| 7,165,036 B2 | 1/2007 | Kruk et al. | |
| 7,200,747 B2 | 4/2007 | Riedel et al. | |
| 7,316,033 B2 | 1/2008 | Risan et al. | |
| 7,446,803 B2* | 11/2008 | Leow et al. | 348/231.5 |
| 7,454,019 B2 | 11/2008 | Williams | |
| 7,551,755 B1 | 6/2009 | Steinberg et al. | |
| 7,555,148 B1 | 6/2009 | Steinberg et al. | |
| 7,561,723 B2 | 7/2009 | Goldberg | |
| 7,564,994 B1 | 7/2009 | Steinberg et al. | |
| 7,664,233 B1 | 2/2010 | Kirchmeier et al. | |
| 7,894,639 B2 | 2/2011 | Grim, III et al. | |
| 8,005,272 B2 | 8/2011 | Grim, III et al. | |
| 8,010,645 B2* | 8/2011 | Shivaji Rao | 709/223 |
| 8,014,573 B2 | 9/2011 | Boomer et al. | |
| 2002/0184196 A1 | 12/2002 | Lehmeier et al. | |
| 2002/0188453 A1 | 12/2002 | Hirschberg et al. | |
| 2003/0071902 A1* | 4/2003 | Allen et al. | 348/211.11 |
| 2003/0077074 A1 | 4/2003 | Okamoto et al. | |
| 2003/0126596 A1* | 7/2003 | Kim | 725/30 |
| 2003/0163339 A1 | 8/2003 | Elliot | |
| 2004/0024688 A1 | 2/2004 | Bi et al. | |
| 2004/0049571 A1 | 3/2004 | Johnson et al. | |
| 2004/0155981 A1 | 8/2004 | Ichifuji et al. | |
| 2004/0180683 A1 | 9/2004 | Dennis et al. | |
| 2004/0213437 A1 | 10/2004 | Howard et al. | |
| 2004/0246127 A1 | 12/2004 | Junqua | |
| 2005/0075097 A1 | 4/2005 | Lehikoinen et al. | |
| 2005/0105779 A1 | 5/2005 | Kamei | |
| 2005/0154682 A1 | 7/2005 | Taylor | |
| 2005/0162279 A1 | 7/2005 | Marshall et al. | |
| 2005/0180567 A1 | 8/2005 | Williams | |
| 2005/0182701 A1 | 8/2005 | Cheston et al. | |
| 2005/0207622 A1 | 9/2005 | Haupt et al. | |
| 2005/0216274 A1 | 9/2005 | Kim | |
| 2005/0250548 A1 | 11/2005 | White | |
| 2005/0257241 A1 | 11/2005 | Faulkner et al. | |
| 2005/0264412 A1 | 12/2005 | Levesque et al. | |
| 2005/0270178 A1 | 12/2005 | Ioli | |
| 2006/0020630 A1 | 1/2006 | Stager et al. | |
| 2006/0028488 A1* | 2/2006 | Gabay et al. | 345/626 |
| 2006/0072811 A1 | 4/2006 | Porter et al. | |
| 2006/0089912 A1 | 4/2006 | Spagna et al. | |
| 2006/0098088 A1 | 5/2006 | Raghunath | |
| 2006/0156417 A1 | 7/2006 | Choi | |
| 2006/0171453 A1* | 8/2006 | Rohlfing et al. | 375/240.01 |
| 2006/0200541 A1 | 9/2006 | Wikman et al. | |
| 2006/0222244 A1 | 10/2006 | Haupt et al. | |
| 2006/0224846 A1 | 10/2006 | Amarendran et al. | |
| 2006/0227237 A1 | 10/2006 | Kienzle et al. | |
| 2006/0287014 A1* | 12/2006 | Matsuura et al. | 455/575.2 |
| 2007/0003113 A1 | 1/2007 | Goldberg | |
| 2007/0036395 A1 | 2/2007 | Okun | |
| 2007/0049984 A1 | 3/2007 | Osypka | |
| 2007/0112852 A1 | 5/2007 | Sorvari et al. | |
| 2007/0118372 A1 | 5/2007 | Wise et al. | |
| 2007/0124249 A1 | 5/2007 | Aerrabotu et al. | |
| 2007/0124272 A1 | 5/2007 | DeCastra et al. | |
| 2007/0150517 A1 | 6/2007 | Malone | |
| 2007/0228159 A1 | 10/2007 | Kashiwa et al. | |
| 2007/0294273 A1 | 12/2007 | Bendeck et al. | |
| 2007/0296817 A1 | 12/2007 | Ebrahimi et al. | |
| 2008/0016193 A1 | 1/2008 | Allen et al. | |
| 2008/0046352 A1 | 2/2008 | Jung et al. | |
| 2008/0046406 A1 | 2/2008 | Seide et al. | |
| 2008/0071561 A1 | 3/2008 | Holcombe | |
| 2008/0130960 A1 | 6/2008 | Yagnik | |
| 2008/0159601 A1 | 7/2008 | Alberth et al. | |
| 2008/0253623 A1 | 10/2008 | Hauke | |
| 2009/0030952 A1 | 1/2009 | Donahue et al. | |
| 2009/0049413 A1 | 2/2009 | Lehtovirta et al. | |
| 2009/0109286 A1 | 4/2009 | Ennis | |
| 2009/0129757 A1* | 5/2009 | Mori et al. | 386/124 |
| 2009/0171902 A1* | 7/2009 | MacLaurin et al. | 707/3 |
| 2009/0177700 A1 | 7/2009 | Grim, III et al. | |
| 2009/0295911 A1 | 12/2009 | Grim, III et al. | |

OTHER PUBLICATIONS

USPTO Final Office Action for U.S. Appl. No. 12/347,182 dated Oct. 27, 2010.
U.S. Appl. No. 11/968,772, filed Jan. 3, 2008, Boomer et al.
U.S. Appl. No. 12/277,804, filed Nov. 25, 2008, Grim, III et al.
U.S. Appl. No. 12/130,549, filed May 30, 2008, Grim, III et al.
U.S. Appl. No. 12/347,156, filed Dec. 31, 2008, Grim, III et al.
U.S. Appl. No. 12/347,182, filed Dec. 31, 2008, Grim, III et al.
Picard, Ken, "Tales from the Cryptographer—Security Guru Bruce Schneider Busts the Myths of Post-9/11 Safety Measures", Jun. 2006, pp. 1-3, Retrieved Sep. 14, 2007, <http://www.schneier.com/news-019.html>.
Ward, Mark, "Log Your Life via Your Phone", BBC News Online, Mar. 2004, pp. 1-3, Retrieved Sep. 14, 2007, <http://news.bbc.co.uk/2/hi/technology/3497596.stm>.
Seward, Liz, "Sensor rise Powers Life Recorders", BBC News Online, Aug. 2007, pp. 1-3, Retrieved Sep. 14, 2007, <http://news.bbc.co.uk/2/hi/technology/6968591.stm>.
Carter, William, "Personal Life Recorder", William Carter Weblog, Sep. 2004, pp. 1, Retrieved Sep. 14, 2007, <http://interactive.usc.edu/members/will/archives/002470.php>.
Fleming, Nic, "Computers 'Could Store Entire Live by 2026'", Dec. 2006, pp. 1, Retrieved Jan. 2, 2008, <http://www.telegraph.co.uk/core/Content/displayPrintabe.jhtml;jsessionid=C3FA5I1NTKF . . . >.
Genuth, "Saving Your Life on a Hard Drive", Jun. 2006, pp. 1-6, Retrieved Jan. 2, 2008, <http://www.tfpt.info/articles.php?itemId=16/>.
"Welcome", Streav, pp. 1, Retrieved Jan. 2, 2008, <http://streav.sorceforge.net/>.
Vemuri, Sunil, "What Was I Thinking?", Electronic Publishing Group, pp. 1-6, Retrieved Jan. 2, 2008 <http://web.media.mit.edu/~vemuri/wwit/wwit-overview.html>.
USPTO office action for U.S. Appl. No. 12/347,156 dated Jan. 31, 2011.
USPTO office action for U.S. Appl. No. 12/347,182 dated Feb. 2, 2011.
USPTO Notice of allowance for U.S. Appl. No. 12/347,182 dated Apr. 20, 11.
USPTO office action for U.S. Appl. No. 11/968,772 dated Nov. 23, 2010.
USPTO Notice of allowance for U.S. Appl. No. 11/968,772 dated Apr. 19, 2011.
Yasuhiko, Naito, "A Role of Advanced Image Data Logger Systems in Marine Animal Studies", Coast Marine Science, vol. 30, No. 2, Feb. 21, 2006, pp. 407-413, Japan, retrieved from the Internet: URL: http://repository.dl.itc.u-tokyo.ac.jp/dspace/bitstream/2261/5663/1/KJ00004354639.pdf.
"Youtube—Broadcast Yourself" Internet Citation, XP002441767, retrieved from the Internet: URL: http://web.archive.org/web/20051001143606/http://ww.youtube.com.
Ting, J. S. L, et al, "A Dynamic RFID-Based Mobile Monitoring System in Animal Care Management Over a Wireless Network", Wireless Communications, Networking and Mobile Computing, 2007, WICOM 2007, International Conference on, IEEE, Piscataway, NJ, USA, Sep. 21, 2007, pp. 2085-2088.
Healey, Jennifer et al, "Startle Cam: A Cybernetic Wearable Camera", Wearable Computers, 1998. Digest of Papers, Second International Symposium in Pittsburgh, PA, USA, Oct. 19-20, 1998, Los Alamitos, CA, USA, IEEE Comput. Soc, US, Oct. 19, 1998, pp. 42-49.
Frederick, "Surveillance Video Face Recognition (SVFR)", dated Nov. 2007.
Hartnell-Young et al., Article entitled "Lifeblog: A new Concept in Mobile Learning", dated 2005.
USPTO office action for U.S. Appl. No. 11/768,772 dated Mar. 17, 2010.

(56) References Cited

OTHER PUBLICATIONS

USPTO office action for U.S. Appl. No. 12/277,804 dated Jun. 1, 2010.
USPTO office action for U.S. Appl. No. 12/347,182 dated May 28, 2010.
USPTO office action for U.S. Appl. No. 12/347,156 dated Jun. 21, 2010.
USPTO Office Action dated Jul. 18, 2011, regarding U.S. Appl. No. 12/130,549.
USPTO Office Action dated Oct. 7, 2011 for U.S. Appl. No. 12/347,156.
Final Office Action, dated Dec. 13, 2011, regarding U.S. Appl. No. 12/130,549, 20 pages.
Dumais et al., "Stuff I've Seen: A System for Personal Information Retrieval and Re-Use," SIGIR '03: Proceedings of the 26th annual international ACM SIGIR conference on Research and development in informaion retrieval, Jul.-Aug. 2003, pp. 72-79.
Gemmell et al., "MyLifeBits: Fulfilling the Memex Vision (PDF)," ACM Multimedia, Association for Computing Machinery, Inc., Dec. 2002, pp. 235-238.
USPTO Non-final office action dated May 17, 2010 regarding U.S. Appl. No. 11/968,772.
USPTO Final office action dated Aug. 31, 2010 regarding U.S. Appl. No. 11/968,772.
USPTO Notice of allowance dated Oct. 15, 2010 regarding U.S. Appl. No. 12/277,804.
USPTO Final office action dated May 16, 2011 regarding U.S. Appl. No. 12/347,156.

\* cited by examiner

US 9,105,298 B2

DIGITAL LIFE RECORDER WITH SELECTIVE PLAYBACK OF DIGITAL VIDEO

CROSS-REFERENCE TO RELATED APPLICATIONS

This application is a continuation-in-part of application Ser. No. 11/968,772, filed Jan. 3, 2008, status patented, U.S. Pat. No. 8,014,573.

BACKGROUND

1. Field of the Invention

The present invention relates generally to an improved data processing system and in particular to a method and apparatus for processing data recorded by a digital life recorder. Still more particularly, the present invention related to a computer-implemented method, apparatus, and computer program product for controlling the playback of video recorded by a digital life recorder.

2. Description of the Related Art

Advancements in technology have drastically changed the way people do things. Gone are the days of printed encyclopedias. These paper based resources have been replaced by a plethora of information readily available on the World Wide Web. Instead of taking a roll of film to a photo shop to be developed, digital images are stored on computers, laptops, and even in digital photo frames. Additionally, because taking a digital picture does not cost anything, more digital photos are taken than was previously taken by conventional means. The photos represent memories of special or even obscure events. However, searching for a particular photo out of the hundreds or thousands of images stored on a computer is a difficult task. In addition, numerous events in our daily lives are never captured on film. Furthermore, photos do not capture the spoken words, feelings, or environmental factors associated with everyday activities.

Accordingly, there exists a need for a mechanism for dynamically capturing, storing, and presenting data associated with all aspects of daily activities in an efficient manner.

SUMMARY

The illustrative embodiments described herein provide a computer-implemented method and apparatus for controlling the playback of video recorded by a sensing subsystem of a digital life recorder. In one embodiment, the process identifies a selected video feed recorded by a camera of a sensing subsystem responsive to receiving user input. The process then identifies a segment of video from the selected video feed using a personal computing device communicating with a digital life recorder, wherein the digital life recorder records the selected video feed. The process identifies a playback restriction associated with the segment of video and generates a set of commands for restricting playback of the segment of video. Thereafter, the process sends the set of commands to a command processor for execution.

DETAILED DESCRIPTION

Figure 1:
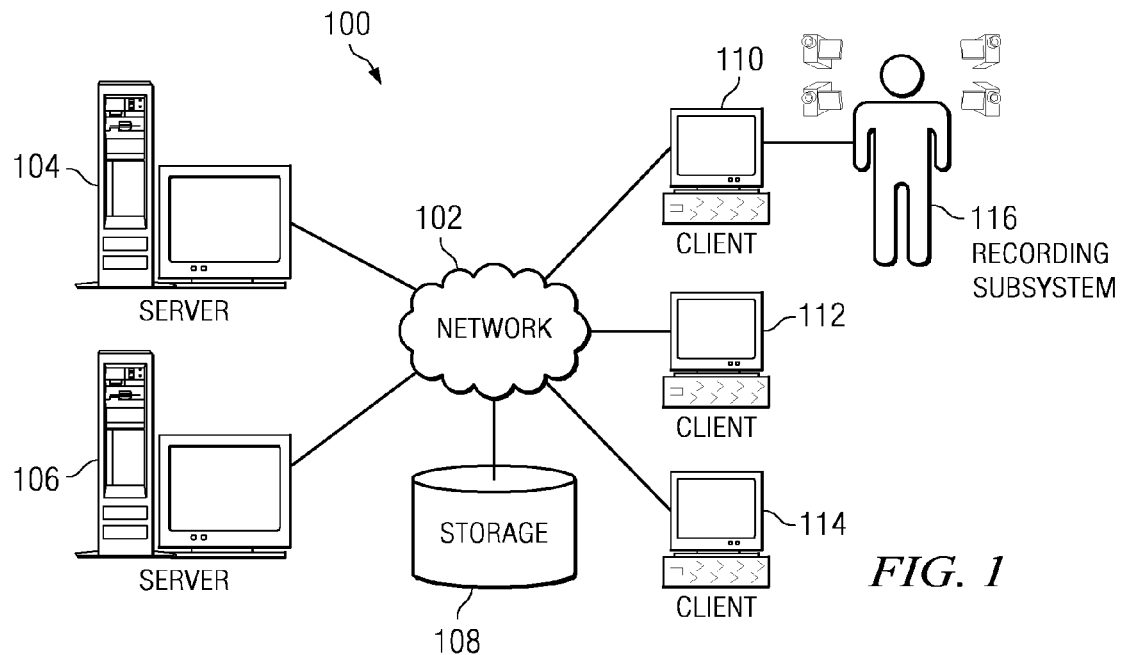
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product comprising a computer-readable medium embodying any tangible medium of expression having computer usable program code embodied in the medium.

Any combination of one or more computer usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
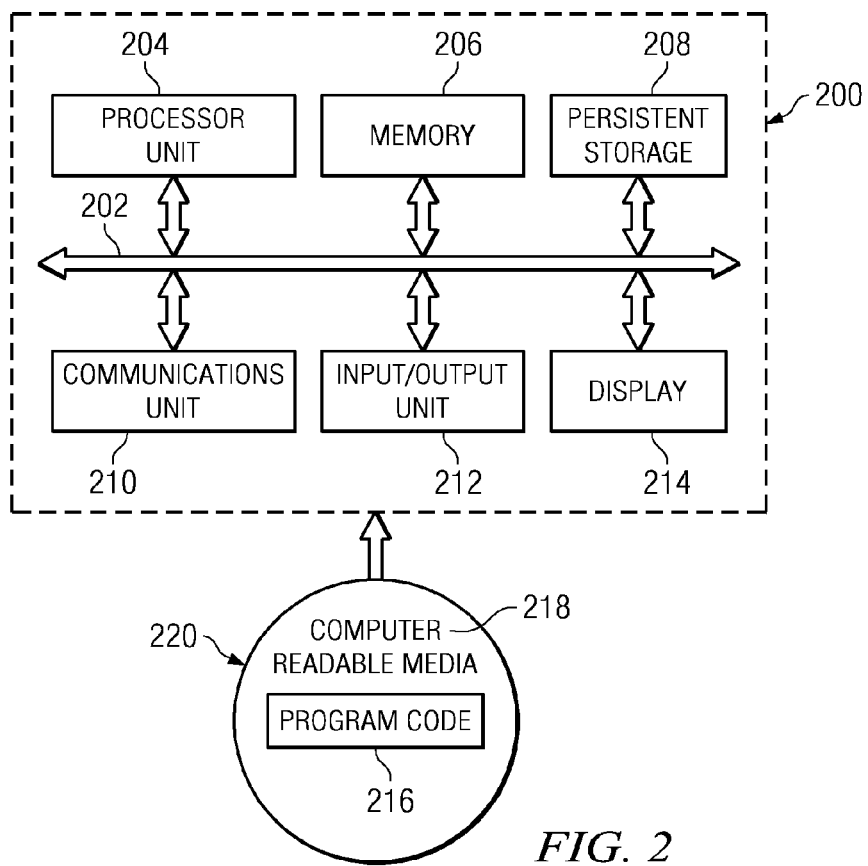
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. The illustrative embodiments may be implemented in a data processing system, such as clients 110, 112, and 114. Clients 110, 112, and 114 may use an Internet browser to communicate with server 104. Network data processing system 100 may include additional servers, clients, and other devices not shown.

The illustrative embodiments may be used as a digital life recorder for capturing still images, video, audio, biometric information and other types of data associated with the daily activities of a person. The activities may be recorded on a continuous basis or may be periodically captured. For example, FIG. 1 depicts a recording subsystem 116. Recording subsystem 116 receives data captured from a plurality of data capturing devices. The data capturing devices may include, but are not limited to, video cameras. The captured data is processed by a mobile device associated with the person and is stored as raw data within a cache of the mobile device. Upon interfacing with a repository mass store, such as client 110, the stored data within the cache of the mobile device is uploaded to the repository mass store. Client 110 manages the data within the repository mass store and presents the data in response to a user request. Additional details of recording subsystem 116 and the repository mass store will be described below.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 comprise computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer-implemented method, apparatus, and computer program product for controlling the playback of video recorded by a sensing subsystem of a digital life recorder. In one embodiment, the process identifies a selected video feed recorded by a camera of a sensing subsystem responsive to receiving user input. The process then identifies a segment of video from the selected video feed using a personal computing device communicating with a digital life recorder, wherein the digital life recorder records the selected video feed. The process identifies a playback restriction associated with the segment of video and generates a set of commands for restricting playback of the segment of video. Thereafter, the process sends the set of commands to a command processor for execution.

Figure 3:
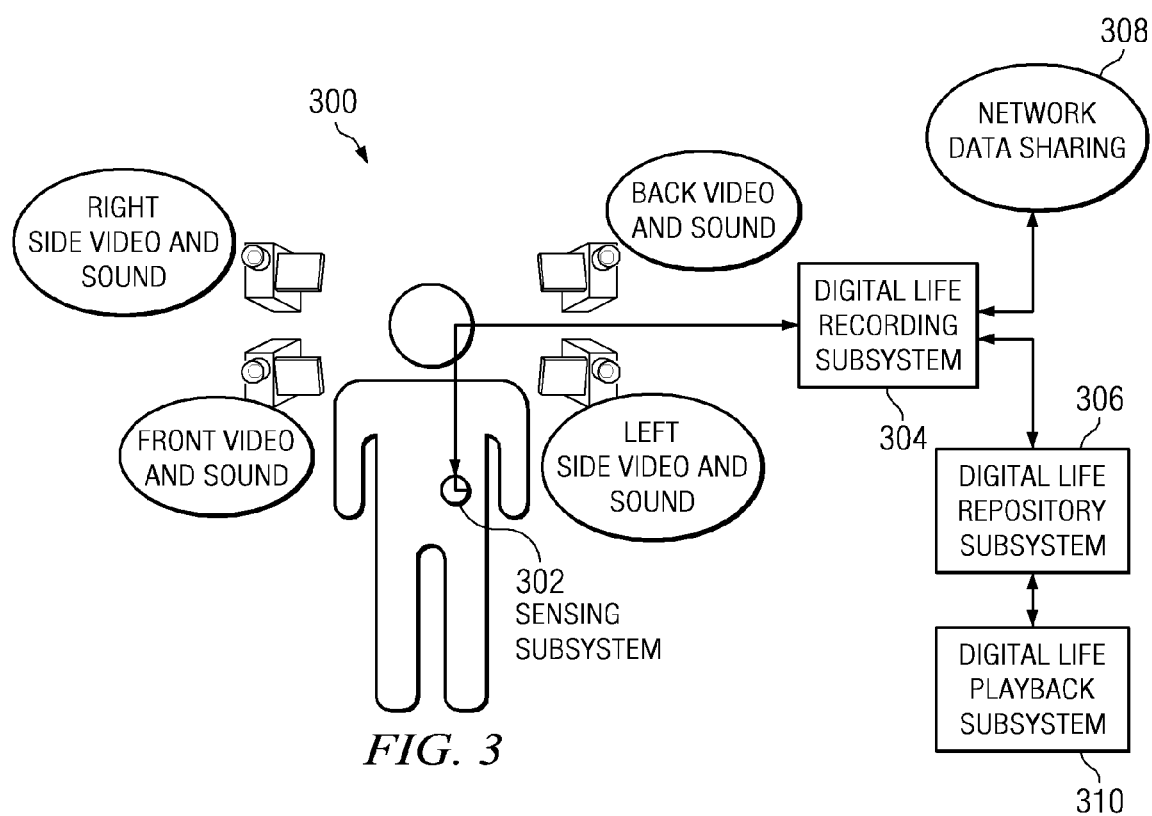
FIG. 3 is a diagram depicting components of a digital life recorder in accordance with an illustrative embodiment.

With reference now to FIG. 3, a diagram of components for a digital life recorder is depicted in accordance with an illustrative embodiment. In this example, digital life recorder 300 comprises of a sensing subsystem 302, a digital life recording subsystem 304, digital life repository subsystem 306, network data sharing 308, and digital life playback subsystem 310. Sensing subsystem 302 and digital life recording subsystem 304 may be implemented in a recording subsystem, such as recording subsystem 116 as shown in FIG. 1. Digital life repository subsystem 306, network data sharing 308, and digital life playback subsystem 310 may be implemented in a data processing system, such as data processing system 200 as shown in FIG. 2 and client 110 as shown in FIG. 1.

Sensing subsystem 302 comprises of data capturing devices for capturing data. The data capturing devices may comprise, for example, without limitation video capturing devices, audio capturing devices, biometric capturing devices, global positioning devices, environmental sensor devices, and other suitable devices for digital life recording. The data captured by the devices of subsystem 302 is referred to as digital life recording data.

As depicted in FIG. 3, the video capturing devices are positioned on the person to capture a 360 degree field of view around the person. Additionally, a set of audio capturing devices may be positioned around the person. A set of biometric sensors captures physiological data associated with the person, such as, but not limited to, the heart rate of the person. A set, as referenced herein, may be comprised of one or more objects. Global positioning system devices coupled to the person captures the location and the precise time that data is captured. A set of environmental sensor devices captures environmental variables, such as, but not limited to, temperature, wind speed, barometric pressure, and humidity.

In addition, the set of environmental sensor devices may detect environmental hazards, such as, but not limited to, detecting the electric field, radiation, and carbon monoxide. Other data capturing devices that may associated with the person may include, but are not limited to, medical devices, cellular telephones, and radio-frequency identification devices.

The data capturing devices for capturing data may be hidden in common apparel such as glasses, a hat, clothing or jewelry. In another illustrative embodiment, some or all of the capturing devices may be medically implanted into the person's body.

Sensing subsystem 302 also comprises of a computer for processing the data captured by the devices into a raw data queue. Further details of sensing subsystem 302 are described in FIG. 4 below.

Sensing subsystem 302 transmits the raw data captured by the data capturing devices to digital life recording subsystem 304. Digital life recording subsystem 304 processes the raw data into a processed data queue and stores the data from the processed data queue into a daily cache of a mobile device associated with the person. The details of digital life recording subsystem 304 will be described in FIG. 5.

Digital life repository subsystem 306 manages the long term storage and cataloging of the information representing the person's "digital life" that accumulates over time. On a periodic basis, digital life repository subsystem 306 interfaces with digital life recording subsystem 304 and uploads data stored in the cache of the mobile device. Additionally, details of digital life repository subsystem 306 will be described in FIG. 10.

Network data sharing 308 is a component of digital life recorder 300. Network data sharing 308 provides functions, such as aggregating, organizing, formats, and attaching metadata to data acquired via public, inter-personal and intra-personal data sharing networks. The resultant aggregate is fed into digital life recording subsystem 304 in these examples. Network data sharing 308 is further described in FIG. 11 below.

Digital life playback subsystem 310 is responsible for the user interface that organizes and presents the information, stored in the digital life repository subsystem 306, to a user for review and further processing. Additional details of digital life playback subsystem 310 will be described in FIG. 12.

Figure 4:
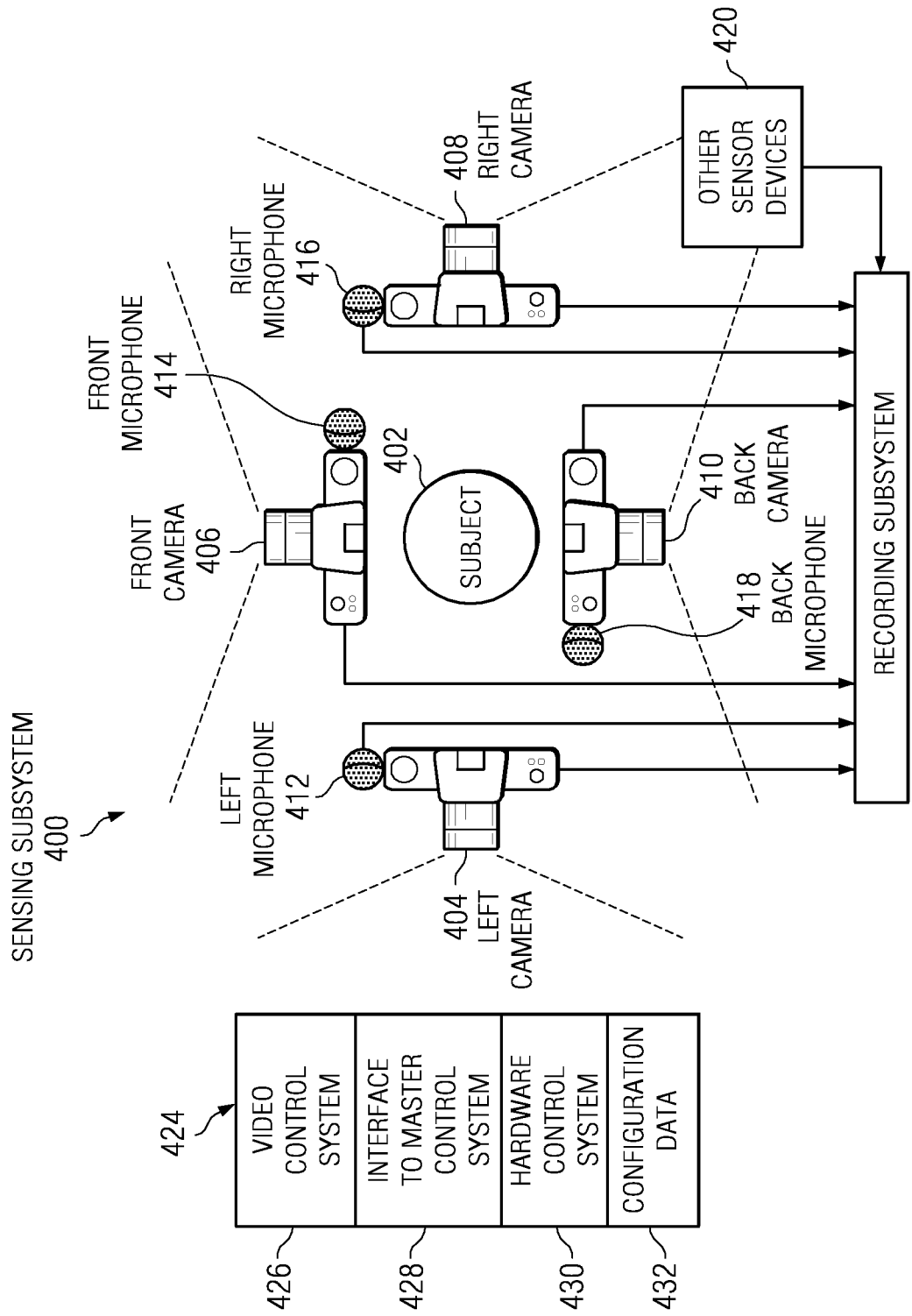
FIG. 4 is a diagram depicting components of a sensing subsystem in accordance with an illustrative embodiment.

With reference now to FIG. 4, a diagram of components in a sensing subsystem is depicted in accordance with an illustrative embodiment. Sensing subsystem 400 comprises of a plurality of data capturing devices associated with a person 402.

In this illustrative example, the data capturing devices comprises of a left camera 404, a front camera 406, a right camera 408, and a back camera 410. Additionally, a left microphone 412, a front microphone 414, a right microphone 416, and back microphone 418 are used for capturing audio data. A global positioning system 420 and other sensor devices 422 may also be associated with person 402. Other sensor devices 422 may include, but are not limited to, a set of biometric devices and a set of environmental sensor devices.

Data model 424 depicts the software components associated with managing sensing subsystem 400. Data model 424 comprises of a video control system 426, an interface to master control system 428, a hardware control system 430, and configuration data 432. The data captured by the data capturing devices is transmitted to a recording subsystem, as will be described below in FIG. 5.

Figure 5:
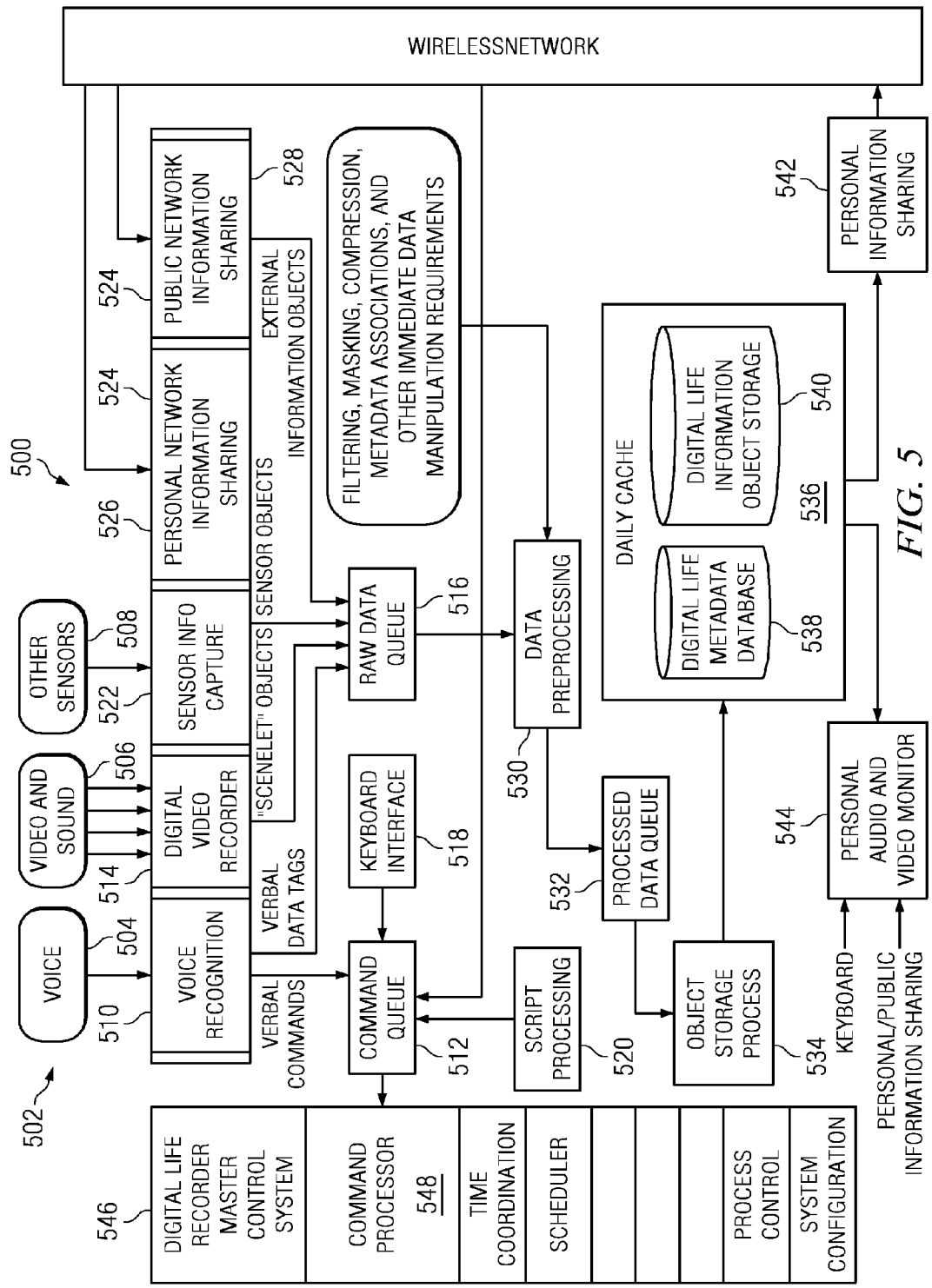
FIG. 5 is a block diagram illustrating an interface of components of a sensing subsystem and the components of a recording subsystem in accordance with an illustrative embodiment.

FIG. 5 is a block diagram illustrating an interface of components of a sensing subsystem and the components of a recording subsystem in accordance with an illustrative embodiment. The components of recording subsystem 500 may be implemented in a data processing system, such as data processing system 200 as shown in FIG. 2.

Recording subsystem 500 processes inputs and commands from all the different sources and stores the data in a daily cache. In this illustrative example, recording subsystem 500 comprises of a voice recognition component 510, a command queue 512, a digital video recorder 514, a raw data queue 516, a keyboard interface 518, a script processing 520, a sensor information capture 522, a data preprocessing component 530, a processed data queue 532, an object storage process 534, and a daily cache 536.

Recording subsystem 500 receives input from sensing subsystem 502. Sensing subsystem 502 depicts inputs received from data capturing devices in accordance with an illustrative embodiment of a sensing subsystem, such as sensing subsystem 302 in FIG. 3. Sensing subsystem 502 is responsible for capturing video and sound, voice commands, time and location, environmental details like temperature, biometric information, and any other information that can be imagined to be useful and for which sensors exist. In this example, inputs captured by sensing subsystem 502 includes voice input 504, video and sound input 506, and input from other sensors 508.

Digital life recorder master control system 546 directs the control of sensing subsystem 502. Master control system 546 passes the captured data on to recording subsystem 500 for further processing.

Recording subsystem 500 sends data received from voice input 504 to voice recognition component 510. Voice recognition component 510 processes the data received from voice input 504 to interpret voice commands. The voice commands are forwarded to command queue 512. Command queue 512 may also receive other types of input, such as, but not limited to, input from a cellular phone (not depicted), keyboard interface 518, or inputs received from script processing 520. A script is a set of commands written in an interpreted language to automate certain application tasks. Command queue 512 sends commands to master control system 546. These commands are executed by a command processor 548. The commands can be used to get feedback through headphones and/or display and allows the user to control and configure the system in near real-time.

Recording subsystem 500 passes data from video and sound input 506 to digital video recorder 514. Digital video recorder 514 converts analog data to digital data and organizes the data into data segments. Digital video recorder 514 also takes in metadata from the data capturing devices. Metadata is data that describes the content, quality, condition, origin, and other characteristics of data. The metadata includes a timestamp and location captured by a global positioning system device, such as global positioning system 418 shown in FIG. 4.

The data segments are tagged with the timestamp and location of when and where each data segment was captured prior to sending the data segments to raw data queue 516. In addition, data is captured from other sensors 508 and processed by sensor information capture 522 prior to relaying the data to raw data queue 516.

Additionally, raw data queue 516 includes external information data gathered from a network data sharing component 524. Network data sharing component 524 aggregates, organizes, formats, and attaches metadata to data acquired via public, inter-personal and intra-personal data sharing networks. Network data sharing component 524 includes a personal network information sharing component 526 and a public network information sharing component 528. Network data sharing component 524 is described in more detail in FIG. 11 below.

Data preprocessing component 530 filters, masks, compresses, applies metadata associations, and processes other immediate data manipulation functions. Data preprocessing component 530 reads information from raw data queue 516 and passes the pre-processed data along to processed data queue 532. Recording subsystem 500 uses processed data queue 532 to temporarily store the data before passing the data along to the object storage process 534. Object storage process 534 places the data into daily cache 536. The data is placed into two separate databases within daily cache 536; digital life metadata database 538 and digital life information object database 540. Daily cache 536 has enough storage capacity to hold the captured data until recording subsystem 500 interfaces with a repository mass store.

Figure 11:
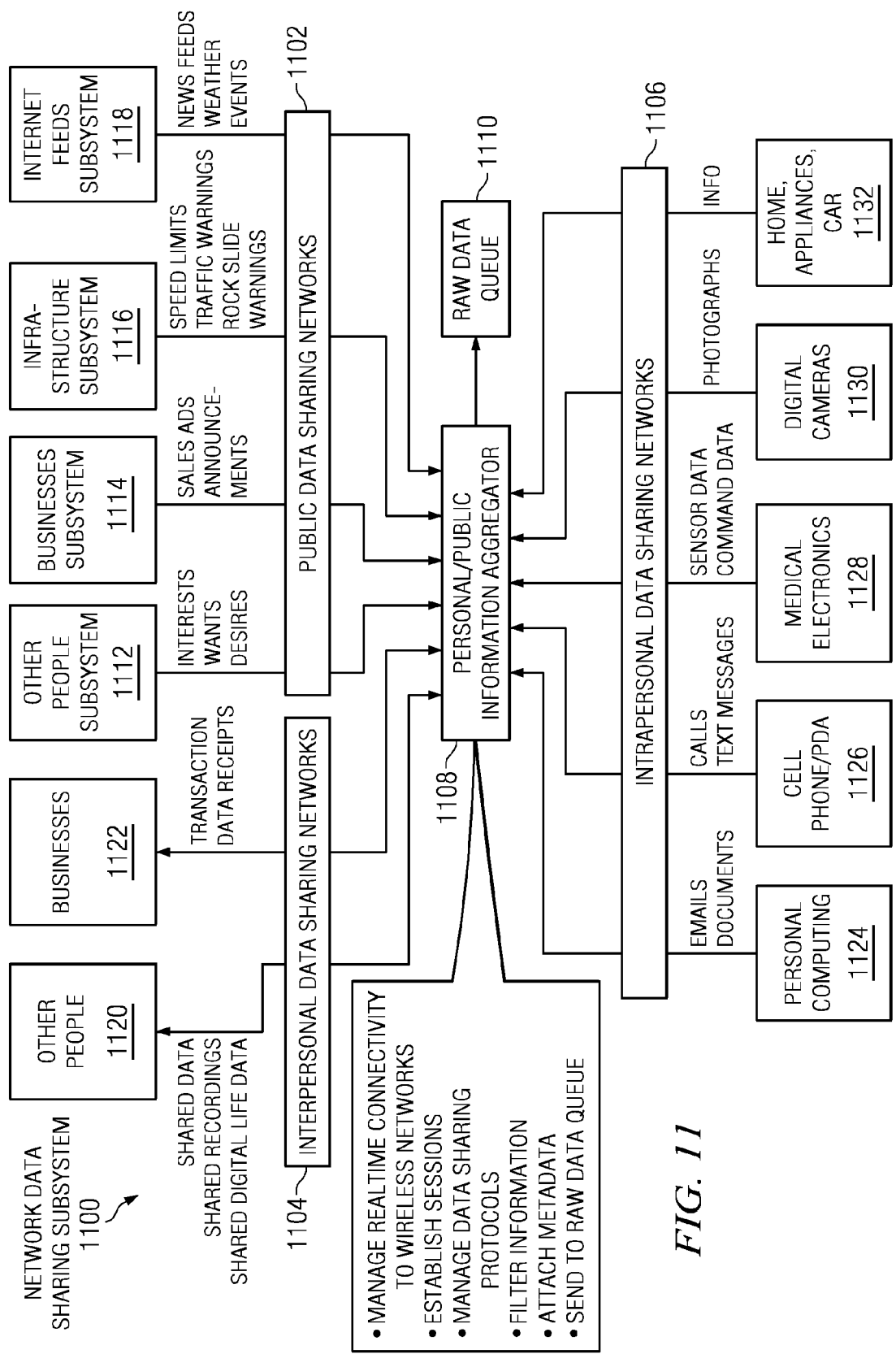
FIG. 11 is a block diagram illustrating the relationship between components of a network data sharing subsystem in accordance with an illustrative embodiment.

Recording subsystem 500 uses a personal information sharing subsystem 542, as will be further described in FIG. 11, to broadcast information from digital life metadata database 538 and digital life information object database 540, within daily cache 536, to authorized users via a wireless or Bluetooth network. Recording subsystem 500 also uses a personal audio and video monitor subsystem 544 to provide a user interface to the data in daily cache 536. Recording subsystem 500 provides a keyboard, which can be used to enter commands and access the user interface functions. Recording subsystem 500 also provides a method to describe and connect to network data sharing component 524.

Figure 6:
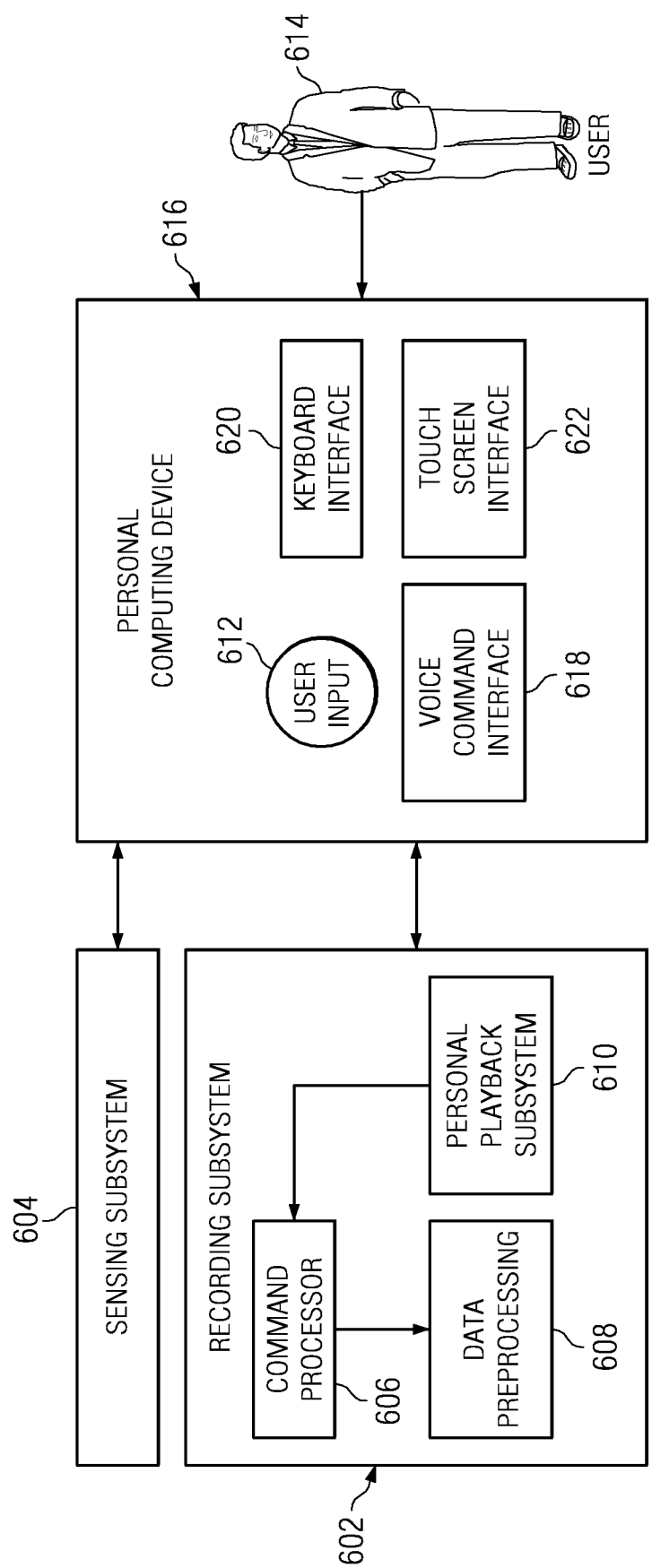
FIG. 6 is a block diagram of a personal computing device interfacing with digital life recorder subsystems in accordance with an illustrative embodiment.

FIG. 6 is a block diagram of a personal computing device interfacing with digital life recorder subsystems in accordance with an illustrative embodiment. Recording subsystem 602 is a recording subsystem such as recording subsystem 500 in FIG. 5. Similarly, sensing subsystem 604 is a sensing subsystem such as sensing subsystem 400 in FIG. 4.

Recording subsystem 602 includes command processor 606 and data preprocessing 608. Command processor 606 is a command processor such as command processor 548 in FIG. 5. Data preprocessing 608 is a data preprocessing component such as data preprocessing 530 in FIG. 5. Recording subsystem 602 also includes personal playback subsystem 610. Personal playback subsystem 610 is a subsystem of recording subsystem 602 for controlling the playback of digital video recorded by sensing subsystem 604. In particular, personal playback subsystem 610 generates commands from information contained within user input 612. The commands, when executed by command processor 606, control the playback of the digital video.

User input 612 is data generated by user 614 by interacting with one or more user interfaces of personal computing device 616. Personal computing device 616 is a device operable by a user for controlling the playback of data recorded by a digital life recorder. Personal computing device 616 may be a client, such as client 110 in FIG. 1. In addition, personal computing device 616 may be a personal communications device, such as a smart phone, cellular telephone, personal digital assistant, or other computing device. In this illustrative example in FIG. 6, personal computing device 616 is a smart phone. Personal computing device 616 is discussed in further detail in FIG. 7.

Personal computing device 616 includes voice command interface 618. Voice command interface 618 is a component of personal computing device 616 having software and/or hardware for capturing user-generated voice commands. For example, voice command interface 618 may include a voice recognition component such as voice recognition 510 in FIG. 5. In addition, voice command interface 618 may include a microphone, such as microphone 414 in FIG. 4. The user-generated voice commands may be used for controlling playback of digital video recorded by a digital life recorder. In one embodiment, the playback of digital video can be controlled by tagging segments of the digital video with markers identifying a video segment. Playback of the video segment may then be restricted by selecting one of a set of menu options. Menu options may include, for example, deleting, blurring, hiding, or marking as private.

Personal computing device 616 also includes keyboard interface 620. Keyboard interface 620 is a keyboard interface such as keyboard interface 518 in FIG. 5. Keyboard interface 620 may be, for example, the keypad of a cellular telephone or smart phone. Keyboard interface 620 may be used for generating user input 612. An example of keyboard interface 620 generating user input 612 is provided in FIG. 7.

Personal computing device 616 may also include touch screen interface 622. Touch screen interface 622 is an interactive screen that presents visual information and detects user contact. The user contact may be by a finger, stylus, or other form of pointer. A common example of a touch screen interface is the screen of an iPhone offered by Apple, Inc.

In one embodiment, personal computing device 616 communicates with sensing subsystem 604. Data transmitted to personal computing device 616 from sensing subsystem 604 may enable user 614 to view the data being recorded by sensing subsystem 604. User 614 may, in real time, control the playback of digital video being captured by sensing subsystem 604. For example, user 614 may have a scheduled meeting at a confidential location. User 614 may access the cameras of sensing subsystem 604 from personal computing device 616 and may generate user input 612 instructing recording subsystem 602 to blur the video captured by sensing subsystem 604. During playback, the blurred video would prevent others from discerning the confidential location of the meeting.

In another embodiment, user 614 may learn during the course of a meeting that the location in which the meeting is occurring is confidential. User 614 may elect to blur the video collected by sensing subsystem 604 after the conclusion of the meeting. In this situation, user 614 may use personal computing device 616 to identify the video segment recorded during the meeting. Thereafter, the user may cause the video segment to be blurred. For example, user 614 may use personal computing device 616 to generate user input 612 that identifies and blurs a segment of video recorded during the meeting. Personal playback subsystem 610 parses user input 612 to identify commands specified by user 614 on personal computing device 616 for restricting the playback of digital video. Personal playback subsystem 610 forwards user input 612 to command processor 606 for executing the commands identified therein. Command processor 606 then passes user input 612 to data preprocessing 608 for further processing. Data preprocessing 608 may perform intermediate data manipulation, such as filtering, masking, compression, and metadata association. Thereafter, user input 612 may be sent to a processed data queue, such as data processed queue 532 in FIG. 5, before being subjected to an object storage process, such as object storage process 534 in FIG. 5.

Figure 7:
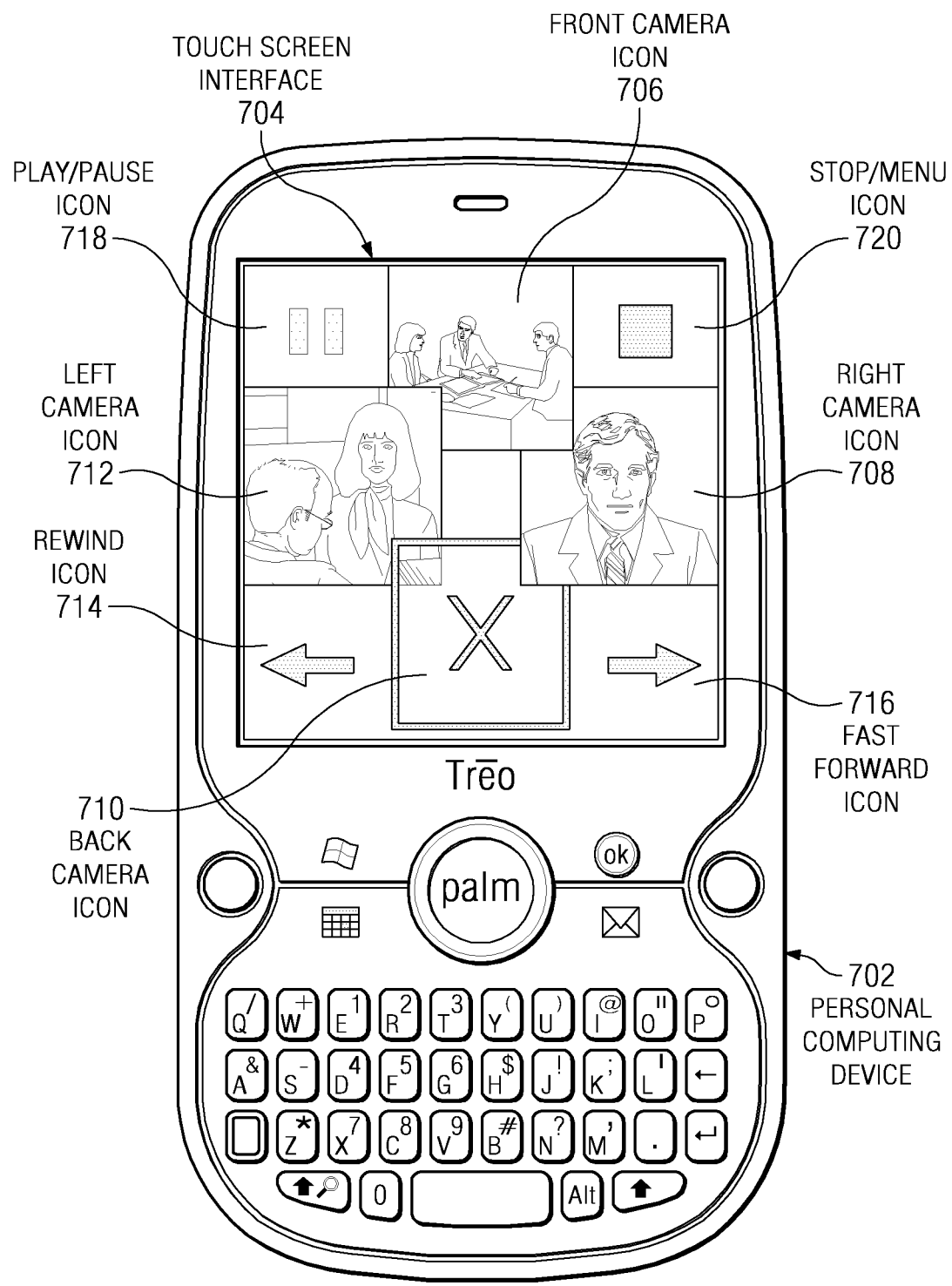
FIG. 7 is a diagram of a personal computing device for controlling a playback of digital video recorded by a digital life recorder in accordance with an illustrative embodiment.

FIG. 7 is a diagram of a personal computing device for controlling a playback of digital video recorded by a digital life recorder in accordance with an illustrative embodiment. Personal computing device 702 is a personal computing device such as personal computing device 616 in FIG. 6.

Personal computing device 702 includes touch screen interface 704. Touch screen interface 704 is a touch screen interface such as touch screen interface 622 in FIG. 6. In this illustrative example in FIG. 7, touch screen interface 704 includes a plurality of icons for enabling a user to control the playback of digital video recorded by a digital life recorder. Touch screen interface 704 includes front camera icon 706, right camera icon 708, back camera icon 710, and left camera icon 712. Each camera icon presents a live video feed from a corresponding video camera of a sensing subsystem, such as sensing subsystem 400 in FIG. 4. Thus, front camera icon 706 presents a live video feed captured by front camera 406, and back camera icon 710 presents a live video feed captured by back camera 410. Similarly, right camera icon 708 and left camera icon 712 present live video feeds from right camera 408 and left camera 404, respectively.

In addition to presenting to a user a live video feed from a corresponding camera, camera icons 706, 708, 710, and 712 may display to a user previously recorded digital video stored in a daily cache, such as daily cache 536 in FIG. 5. For example, the user may select front camera icon 706 by pressing an area of touch screen interface 704 defined by front camera icon 706. The user may then press rewind icon 714 to navigate through previously recorded digital video recorded by the front camera of the digital life recorder. Likewise, the user may press fast forward icon 716 to rapidly advance the digital video playing in front camera icon 706.

The user may also press play/pause icon 718 to pause video or resume playing paused video of front camera icon 706. In one embodiment, if the video in front camera icon 706 is already paused, the user may press stop/menu icon 720 to pull up an option menu. The option menu may include a set of commands, such as set of commands 818 in FIG. 8. The user may then select commands from the set of commands to restrict the playback of video captured by a front camera. In an illustrative example, a user wanting to restrict the playback of a digital video segment first selects a camera view for restriction. The user may select a single camera view or may select all camera views. The user then identifies a digital video segment for restriction. The user identifies the digital video segment by identifying a starting point and an ending point. The starting point may be identified by pressing rewind icon 714 until the desired frame is located. The user may then press stop/menu icon 720 to stop the rewinding of the digital video stream. In another embodiment, the user may also press rewind icon 714 or play/pause icon 718 to terminate the rewinding of the digital video stream. The user may then insert a marker identifying the starting point of the digital video segment. In the same manner, the user may press fast forward icon 716 to locate an endpoint of the digital video segment and insert a marker identifying the endpoint of the digital video segment. Once the digital video segment is identified, the user may select a type of restriction from a menu accessible by pressing stop/menu icon 720. For example, the user may elect to delete, hide, or blur the identified video segment.

A user may also restrict the playback of video as the video is being recorded instead of restricting previously recorded video. For example, the user may elect to blur the video currently being collected by a digital life recorder. In this example, the user selects one or more camera views for restriction. The user may press stop/menu icon 720 and choose the "blur video" option. Thus, all digital video being captured by the selected cameras of the digital life recorder are blurred until the user elects to stop blurring captured video.

In the illustrative example depicted in FIG. 7, the video stream presented in front camera icon 706 is unrestricted. Right camera icon 708 displays blurred video. Back camera icon 710 indicates that the video being captured by a back camera of a sensing subsystem of the digital life recorder is deleted. Left camera icon 712 displaying a lock indicates that the video being collected by a left side camera is private.

In one embodiment, deleted video is deleted entirely from storage. Alternatively, video identified as deleted is not recorded to storage. In yet another embodiment, deleted video is stored in memory but access to deleted video is prohibited. To unauthorized users, the existence of deleted video would not be apparent. However, authorized users may still access video identified as deleted.

Figure 8:
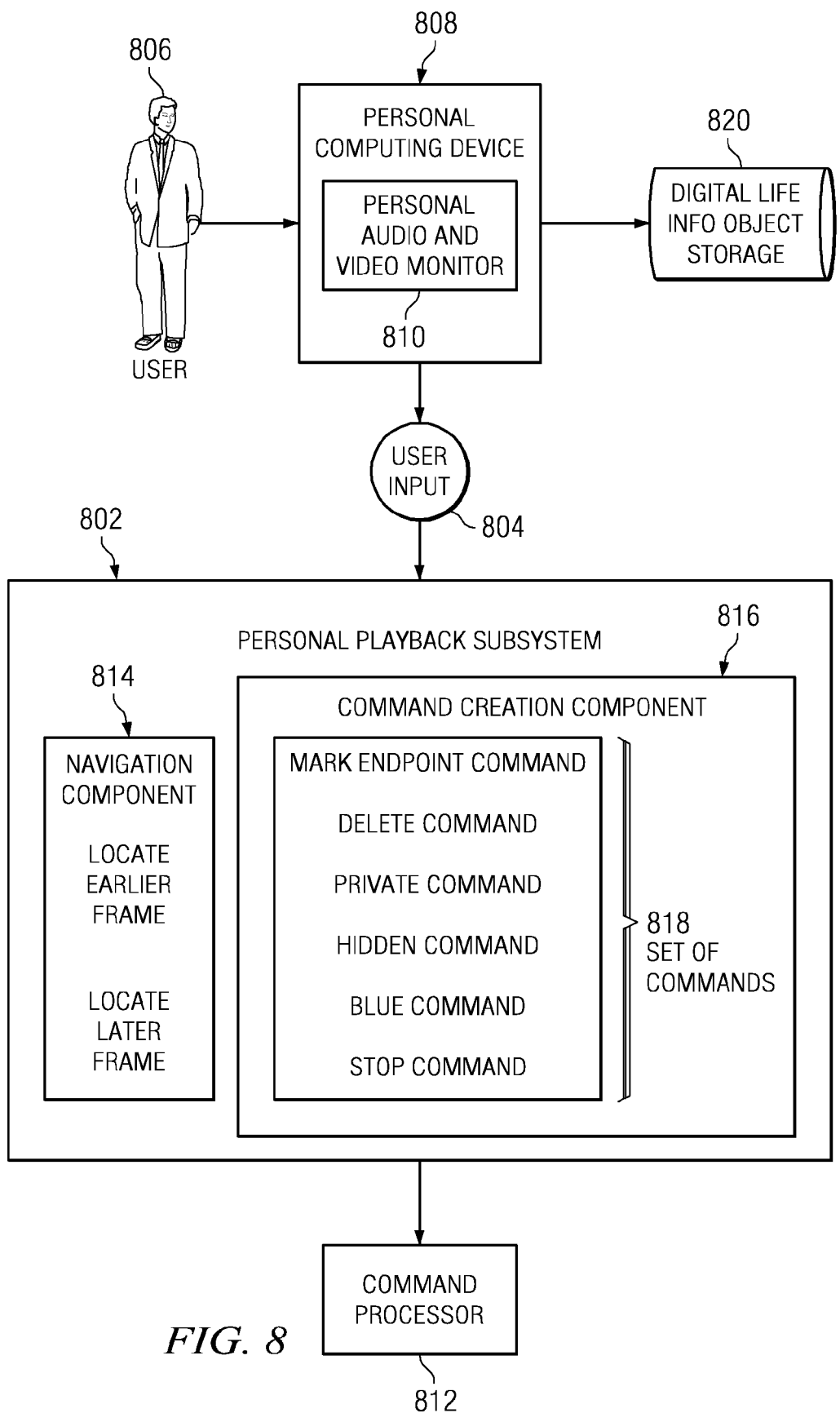
FIG. 8 is a block diagram of a personal playback subsystem in accordance with an illustrative embodiment.

FIG. 8 is a block diagram of a personal playback subsystem in accordance with an illustrative embodiment. Personal playback subsystem 802 is a personal play subsystem such as personal playback subsystem 610 in FIG. 6. Personal playback subsystem 802 receives user input 804 for controlling the playback of digital video recorded by a digital life recorder such as digital life recorder 300 in FIG. 3. User input 804 is user input such as user input 612 in FIG. 6.

User input 804 is generated by user 806 while operating personal computing device 808. Personal computing device 808 is a personal communications device such as personal computing device 616 in FIG. 6. In particular, user 806 generates user input 804 using an interface of personal computing device 808. The interface may be a voice command interface, a keyboard interface, or a touch screen interface, such as voice command interface 618, keyboard interface 620, and touch screen interface 622 in FIG. 6, respectively. In this example in FIG. 8, personal computing device 808 includes personal audio and video monitor 810. Personal audio and video monitor is a personal audio and video monitor such as personal audio and video monitor 544 in FIG. 5. Personal audio and video monitor 810 provides user 806 with an interface by which to access a video stream recorded by a digital life recorder. User 806 may access video stream to restrict subsequent playback. The video stream may be stored in a daily cache of a digital life recorder, such as daily cache 536 in FIG. 5.

Personal playback subsystem 802 receives user input 804 and parses user input 804 to identify user-generated instructions. The user-generated instructions may be voice instructions spoken by user 806, keyboard instructions, touch screen instructions, or any combination thereof. For example, user 806 may select a video stream recorded from a forward-facing camera, such as front camera 406 from a touch screen interface of personal computing device 808. User 806 may then use a keyboard of personal computing device 808 to identify a segment of video for restriction. Thereafter, user 806 may select a menu option for restricting the playback of a segment of video collected from the forward-facing camera. User input 804 includes the user-generated instructions from which commands are generated for execution by command processor 812.

Personal playback subsystem 802 includes navigation component 814. Navigation component 814 is a component of personal playback subsystem 802 configured for enabling user 806 navigation forward and backward through a digital video stream. Forward and backward navigation potentially provides a user 806 with the ability to locate video frames in a video stream that may occur early in a sequence of video frames In particular, the user may use navigation component 814 to locate and mark a first video frame serving as a starting point of the video segment. The user may also use navigation component 814 to locate and mark a second video frame serving as the endpoint of the video segment.

Personal playback subsystem 802 also includes command creation component 816. Command creation component 816 is a component of personal playback subsystem 802 for converting user-generated instructions from user input 804 into commands recognizable by components of a digital life recorder. Command creation component 816 includes set of commands 818. Set of commands 818 is one or more commands that may be generated from user input 804. Examples of commands from set of commands 818 includes, without limitation, a mark endpoint command, delete command, private command, hidden command, blur command, and stop command.

The mark endpoint command enables a user, such as user 806, to mark one or more endpoints to identify a digital video segment for restriction as described above. The delete command enables a user to mark the digital video segment for deletion. Similarly, the private command, hidden command, and blur command enables a user to mark the digital video segment for the specified method of restriction. The stop command enables a user to stop a current action. For example, the stop command may cause a camera of a digital life recorder to stop recording, or may cause a rewinding video to stop rewinding.

Once user input 804 has been parsed for user-generated instructions, command creation component 816 generates commands associated with the user-generated instructions. The commands generated by command creation component 816 are passed to command processor 812 for execution.

In an illustrative embodiment, user 806 operates personal computing device 808 to control the playback of digital video recorded by a digital life recorder. In particular, user 806 generates user input 804 that includes instructions for processing the digital video recorded by a sensing subsystem of a digital life recorder. User input 804 is parsed by personal playback subsystem 802 and commands from set of commands 818 is associated with the instructions parsed from user input 804. The commands are then passed to command processor 812 for execution.

In another illustrative embodiment, user 806 may access restricted digital video segments via personal audio and video monitor 810. In addition, user 806 may remove restrictions from digital video segments. In this example in FIG. 8, user 806 accesses personal audio and video monitor 810 via personal computing device 808 to access restricted video stored in digital life information object storage 820. For example, user 806 may select a camera view and locate a segment of restricted video from digital life information object storage 820. User 806 may elect to view the restricted video or remove the restriction to allow unobstructed viewing of the video segment. Before allowing user 806 access to the segment of restricted video, personal audio and video monitor 810 may prompt user 806 for a password. Once personal audio and video monitor 810 has validated the password provided by user 806, user 806 may be granted access to the restricted video segment.

Figure 9:
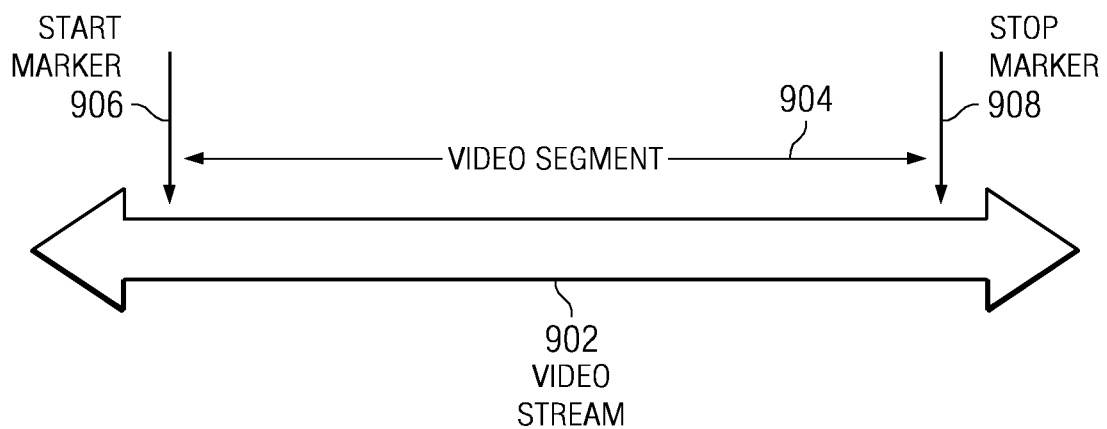
FIG. 9 is a diagram of a segment of digital video identified from a video stream in accordance with an illustrative embodiment.

FIG. 9 is a diagram of a segment of digital video identified from a video stream in accordance with an illustrative embodiment. Video stream 902 is a stream of video that may be captured and recorded by a camera of a sensing subsystem such as sensing subsystem 400 in FIG. 4. Video stream 902 may be stored in a daily cache or in a repository subsystem such as repository subsystem 1000 in FIG. 10.

In this illustrative example in FIG. 9, a user selects video stream 902 for restriction. The user then identifies video segment 904 from video stream 902 using start marker 906 and stop marker 908. Start marker 906 and stop marker 908 are markers that identify a video segment. The user locates a frame from video stream 902 for inserting start marker 906. The user then inserts start marker 906 by selecting the appropriate menu option. The user then locates a frame from video stream 902 for inserting stop marker 908. The user inserts stop marker 908 by selecting the appropriate menu option.

Once video segment 904 is identified, a user may select a method of restriction for controlling the playback of video segment 904. For example, a user may select to blur video stream 902. In this example, any unauthorized user playing video stream 902 would see a blurred video when the unauthorized user attempts to view video segment 904.

Figure 10:
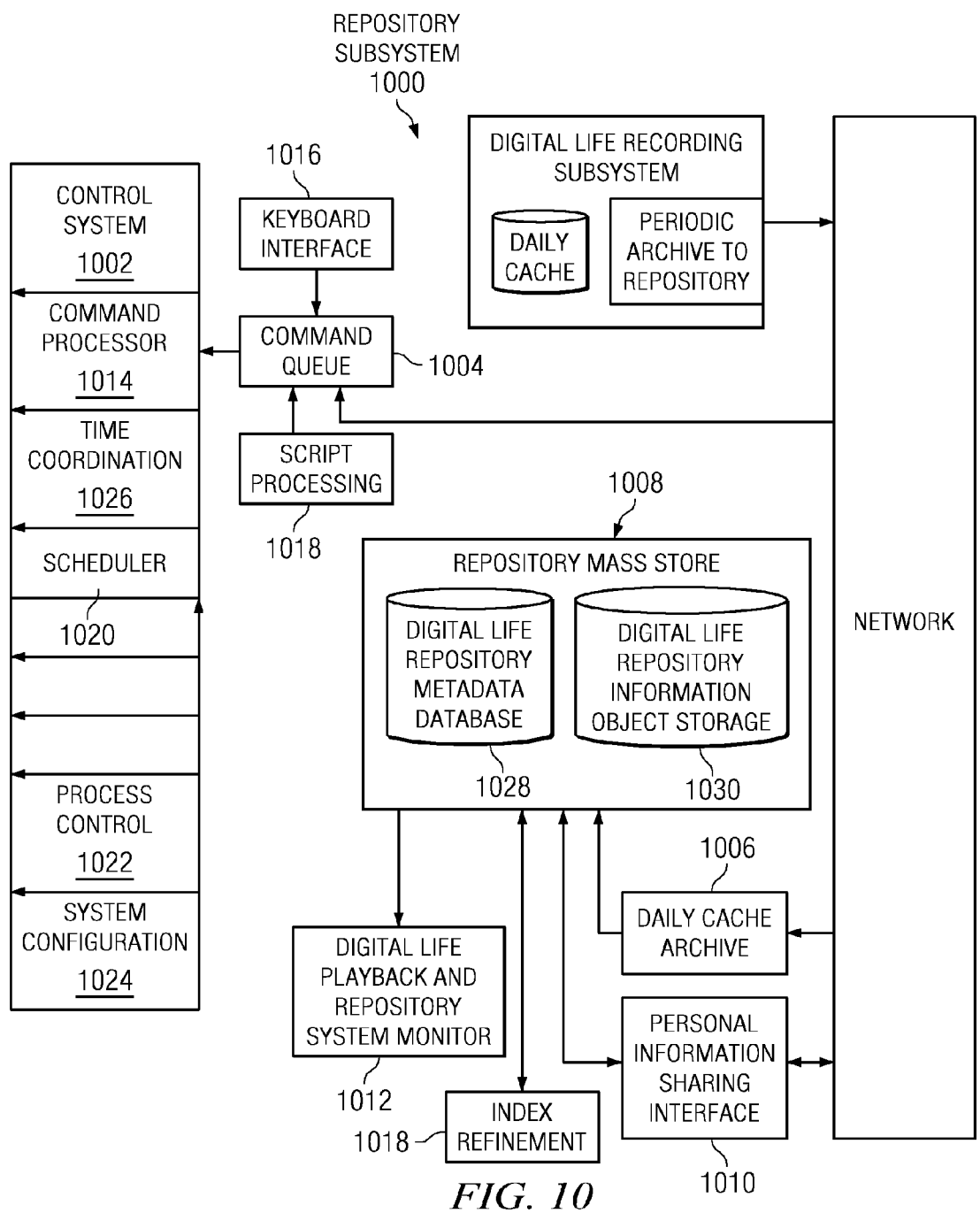
FIG. 10 is a block diagram illustrating the relationship between a recording subsystem and the components of a repository subsystem is depicted in accordance with an illustrative embodiment

With reference now to FIG. 10, a block diagram illustrating the relationship between a recording subsystem and the components of a repository subsystem is depicted in accordance with an illustrative embodiment. The recording subsystem may be, for example, recording subsystem 500 shown in FIG. 5. The components of repository subsystem 1000 illustrated in FIG. 10 may be implemented in a data processing system, such as data processing system 200 as shown in FIG. 2.

Repository subsystem 1000 includes a control system 1002, a command queue 1004, a network interface (not depicted), a relational storage means called the repository (repository database 1008), personal information sharing interface 1010, and an interface to the playback subsystem (Digital Life Playback and Repository System Monitor 1012).

Control system 1002 contains a command processor 1014 which interprets and executes commands generated by either a keyboard interface 1016, remote operation via the network, or scripts which are executed (script processing 1018) according to a scheduler 1020. In addition, control system 1002 manages, processes and threads (process control 1022, system configuration 1024, and any time coordination 626 that might be required.

A recording subsystem, such as recording subsystem 500 in FIG. 5, interfaces with a network, such as network 102 shown in FIG. 1, to upload data stored in the daily cache to repository subsystem 1000. Repository subsystem 1000 interfaces to the network to download the daily cache archive 1006 previously stored by the recording subsystem.

Repository subsystem 1000 stores the data into repository database 1008. Repository database 1008 includes two databases, digital life repository metadata database 1028 and digital life repository information object storage 1030, for long term storage and use. Digital life repository information object storage 1030 stores the captured life data objects. Digital life repository metadata database 1028 stores metadata used to index and describe the actual captured information objects that the Digital Life Recording Subsystem acquires during the life recording process. Additionally, repository database 1008 may include information obtained through personal information sharing interface 1010. Additional details of the network data sharing subsystem are described in more detail in FIG. 11 below.

On an ongoing basis, the indexing information in digital life repository metadata database 1028 may be enhanced and refined by processes that study the capture data in the repository and update the index information (Ongoing Data and Index Refinement 1018). An example of the refinement process includes analyzing audio data within an object to recognize words associated with the captured object. These words are then used as part of a full text search capability where the identified words are used as index information that points to the data objects that contains those words.

An interface, such as digital life playback and repository system monitor 1012, exists between repository subsystem 1000 and a playback subsystem. Digital life playback and repository system monitor 1012 allows the playback subsystem to access the data existing in repository database 1008 based on various searching techniques. The playback subsystem manages displaying of the data to a user. Digital life playback and repository system monitor 1012 also manages the status and manipulation of the repository subsystem 1000. Additional details of a playback subsystem are described in more detail in FIG. 12 below.

With reference now to FIG. 11, a block diagram illustrating the relationship between components of a network data sharing subsystem is depicted in accordance with an illustrative embodiment. The components of network data sharing subsystem 1100 illustrated in FIG. 11 may be implemented in a data processing system, such as data processing system 200 as shown in FIG. 2.

Network data sharing subsystem 1100 includes public data sharing network 1102, interpersonal data sharing network 1104, intrapersonal data sharing network 1106, and a personal/public information aggregator 1108.

Public data sharing network 1102 provides connectivity to information that is being locally broadcast as well as predefined Internet feeds. The system may be composed of wireless networks configured to connect automatically when detected. Hard networks may also be used to capture additional information.

Additionally, public data sharing network 1102 captures nearby information, from other people broadcasting information about themselves, via the other people subsystem 1112. This information might be information about their interests and desires. Public data sharing network 1102 also captures business information from nearby business broadcasts, such as, but not limited to, sales and advertisements via the businesses subsystem 1114.

Additionally, public data sharing network 1102 captures public and private infrastructure broadcasts via the infrastructure subsystem 1116. The public and private infrastructure information may include, but are not limited to, speed limits, traffic conditions/warnings, and weather condition warnings. Public data sharing network 1102 supports any network connectivity that allows Internet access via the Internet Feeds subsystem 1118. Internet Feeds subsystem 1118 is used to receive web based information, such as, but not limited to, news, weather, entertainment, and sports results.

Interpersonal data sharing network 1104 is more specific to the person being monitored than is public data sharing network 1102. Interpersonal data sharing network 1104 does not receive broadcasts. Instead, interpersonal data sharing network 1104 negotiates connections with Other People 1120 and Businesses 1122 to receive transaction oriented information for recording. For example, transaction information associated with transactions that occur between businesses and the person are recorded. The transaction information may include information about purchases, such as, but not limited to, price, model numbers, serial numbers, warranties, and receipts. Information shared from other people's digital life recording system is captured using a subsystem, such as other people 1120.

Intrapersonal data sharing network 1106 aggregates personal information about the person's life for recording. The personal information may be aggregated from a plurality of sources including, but not limited to, personal computing 1124, cell phone/personal digital assistants (PDA) 1126, medical electronics 1128, digital cameras 1130, and home appliances/car 1132. The information captured from personal computing 1124 may include, but is not limited to, emails, computer files, computer-based communications like instant messages or voice over IP (VOIP). Bluetooth or other wireless/wired connectivity may be used for interfacing the data to the digital life recorder.

Intrapersonal data sharing network 1106 may also capture cell phone conversations and PDA usage from cell phone/PDA 1126 using Bluetooth connectivity or other transmission means. Additionally, intrapersonal data sharing network 1106 may record the command and data associated with medical electronics 1128. Images may also be captured from digital cameras 1130. Digital cameras 1130 include cameras that are not already associated with the sensing subsystem. Other data may include information associated with home appliances/car 1132.

Personal/public information aggregator 1108 aggregates, organizes, formats, and attaches metadata to data acquired via public data sharing network 1102, interpersonal data sharing network 1104, and intrapersonal data sharing network 1106. The resultant aggregate is fed into the raw data queue 1110 of a recording subsystem, such as recording subsystem 500 in FIG. 5.

Figure 12:
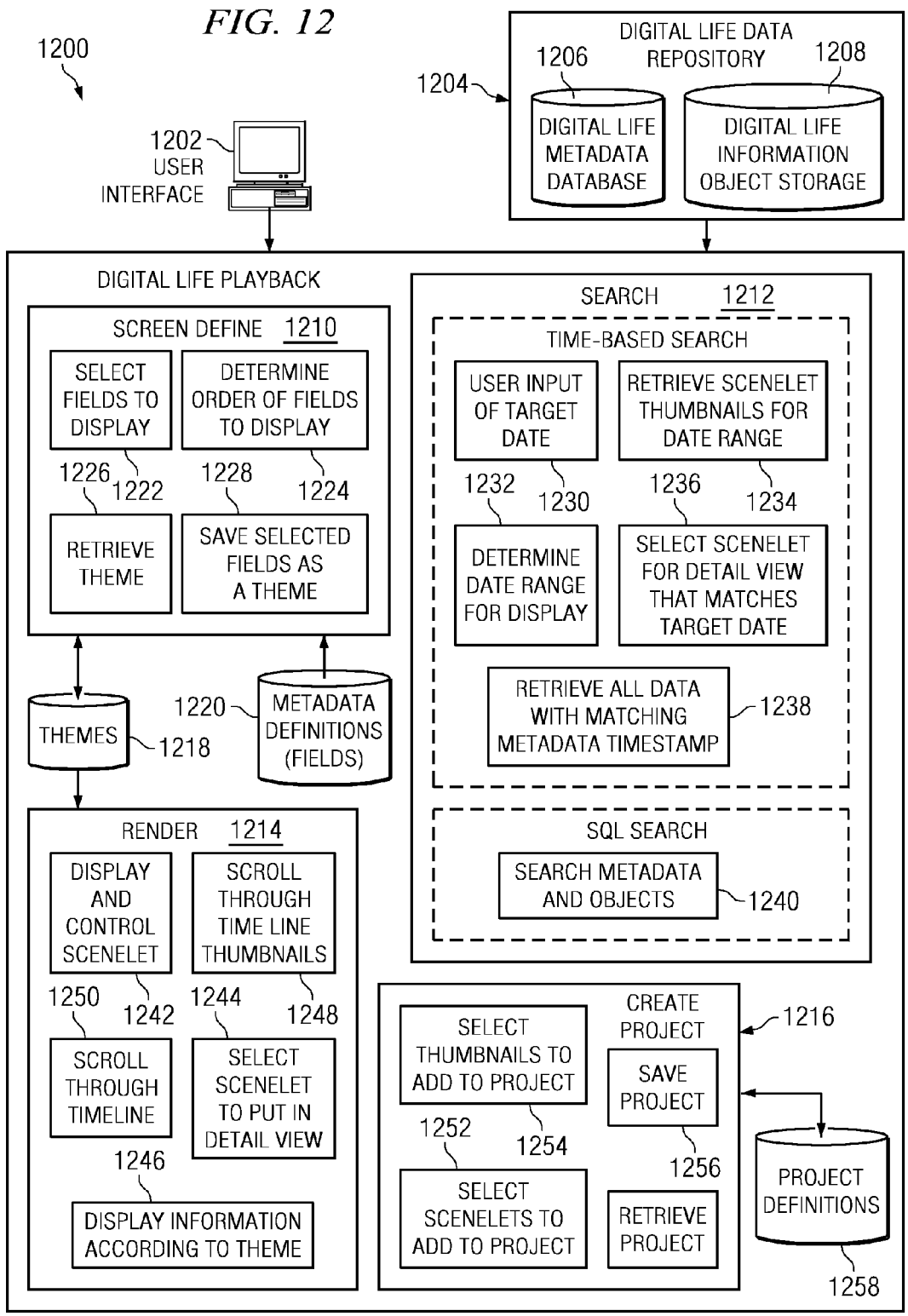
FIG. 12 is a block diagram illustrating the components of a playback subsystem in accordance with an illustrative embodiment.

Turning now to FIG. 12, a block diagram illustrating the components of a playback subsystem is depicted in accordance with an illustrative embodiment. The components of playback subsystem 1200 illustrated in FIG. 12 may be implemented in a data processing system, such as data processing system 200 as shown in FIG. 2.

In this example, playback subsystem 1200 comprises of several subsystems, such as, but not limited to, screen define subsystem 1210, search subsystem 1212, render subsystem 1214, and create project subsystem 1216. Additionally, playback subsystem 1200 includes a user interface 1202 associated with the digital life recording system. User interface 1202 may be used to organize and present information stored in a data repository, such as repository database 1008 shown in FIG. 10. Playback subsystem 1200 interfaces with digital life data repository 1204. Digital life data repository 1204 includes digital life metadata database 1206 and digital life information object storage database 1208. Digital life data repository 1204 may be similarly implemented as repository database 1008 shown in FIG. 10.

Screen define subsystem 1210 provides an interface to receive user inputs, such as, but not limited to, selecting the type of information a user wants to view. The type of information may include, but is not limited to, video information, sound information, temperature sensor information, or any of the other information captured by the recording system or network data sharing system. The definition for these types of information and their mapping to the digital life data database is managed through the metadata definitions database 1220. The information can be organized on user interface 1202 and then saved in a themes database 1218 using the function save selected fields as a theme (block 1228). Saved themes may be retrieved from themes database 1218 using the retrieve theme (block 1226) functionality. Other functionality provided by screen define subsystem 1210 may include, but is not limited to, computer usable program code that allows a user to select fields to display (block 1222), and to determine order of fields to display (block 1224).

Search subsystem 1212 allows a user to input a date/time range to select the data that the user wants to view (block 1230). Search subsystem 1212 determines the initial date range to display on the user interface (block 1232) prior to searching digital life data repository 1204. Search subsystem 1212 retrieves the scenelet thumbnails from digital life information object storage database 1208 for the time slices within the date range (block 1234). A scenelet is a snippet of a scene. Additional details about a selected scenelet may be viewed (block 1236).

For all non-video information or metadata that is to be displayed on the screen, such as, but not limited to, sound and temperature, similar searching is performed and summaries retrieved for each time slice (block 1238). Detailed information for the requested date/time will also be retrieved. Similarly, a generic searching capability is provided that uses standard search language queries, such as Structured Query Language (SQL), to allow access to any aspect of the digital life data repository 1204 (block 1240).

Render subsystem 1214 is used to render the information retrieved, using search subsystem 1212, on user interface 1202. As stated above, the layout of user interface 1202 is defined using screen define subsystem 1210 and stored in themes database 1218. Render subsystem 1214 provides functionality to display, manipulate, and control a scenelet (block 1242), select a scenelet for a detail view (block 1244), display information according to theme (block 1246), scroll through time line of thumbnails (block 1248), and scroll through time line (block 1250).

Create project subsystem 1216 is used to support the creation of a saved set of information found in digital life data repository 1204. A user may, using user interface 1202, select either scenelets (block 1252) or thumbnails (block 1254), from the render subsystem 1214 and save the group of items as a project (block 1256) in a project definitions database 1258. Additionally, previously saved projects may be retrieved from the project definitions database 1258 using user interface 1202.

Figure 13:
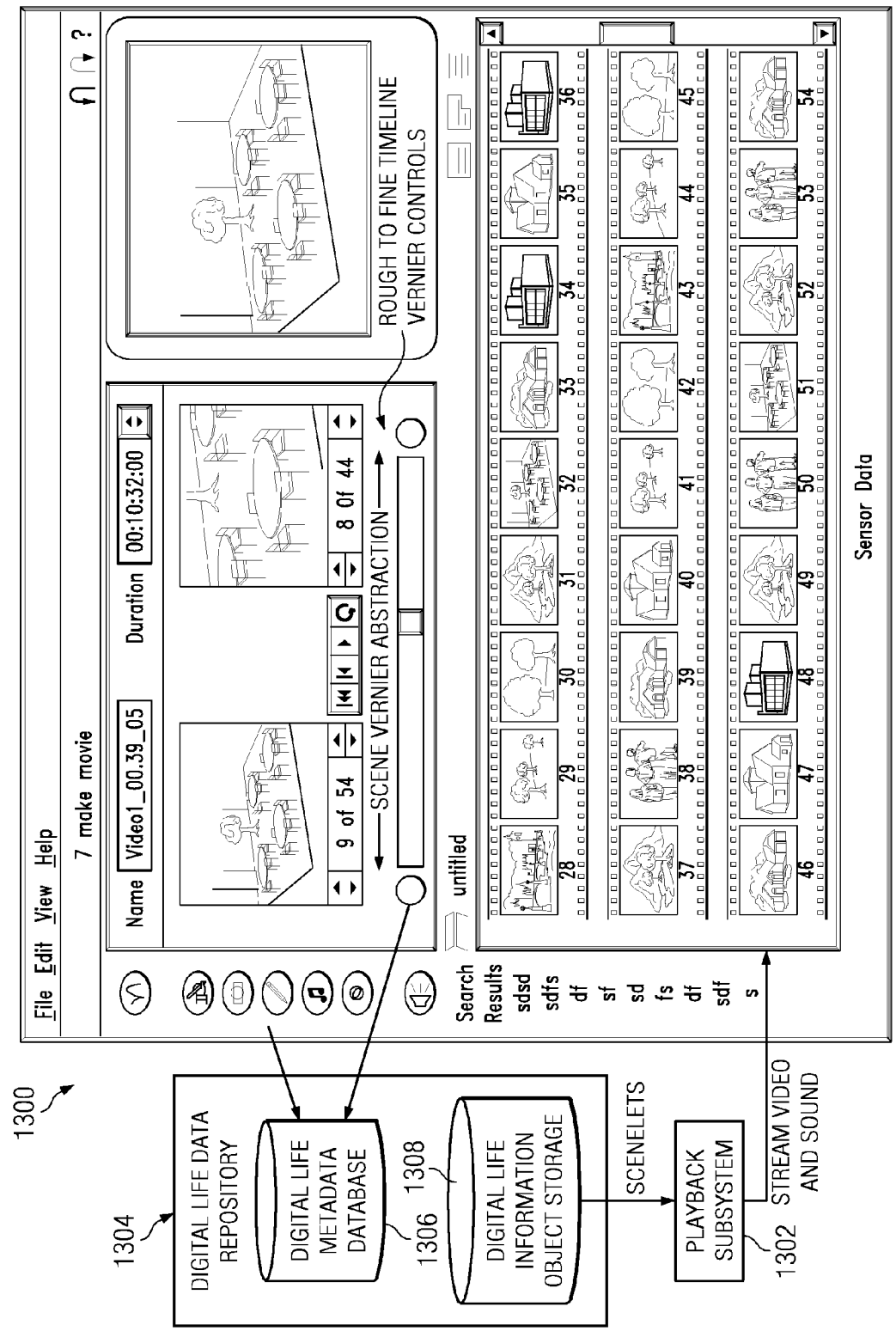
FIG. 13 is a diagram depicting a user interface associated with the playback subsystem in accordance with an illustrative embodiment.

With reference now to FIG. 13, a user interface 1300 associated with a playback subsystem 1302 is depicted in accordance with an illustrative embodiment. Playback subsystem 1302 uses data acquired from a digital life data repository 1304. Digital life data repository 1304 contains digital life metadata database 1306 and digital life information object storage database 1308. Digital life data repository 1304 may be similarly implemented as repository database 1008 shown in FIG. 10.

The results associated with a search are depicted on the left hand side of user interface 1300. Additionally, user interface 1300 provides a mechanism for adjusting the timeline vernier. The timeline vernier controls the precision of time. Thus, a user can adjust from a rough timeline vernier to a more precise/fine timeline vernier. Scenelets associated with a selected result is presented in the bottom half of user interface 1300.

Figure 14:
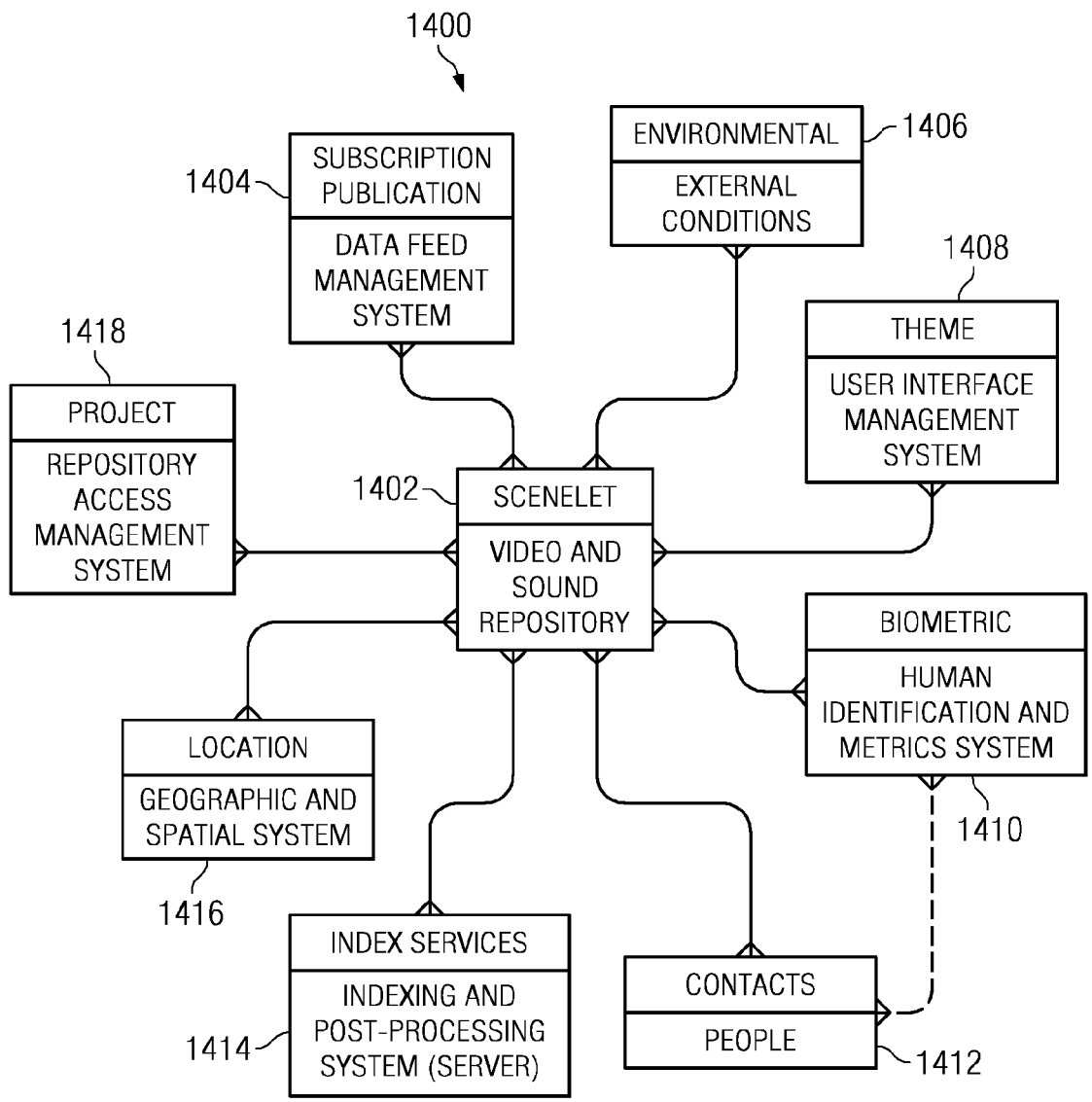
FIG. 14 is a diagram of a data model in accordance with an illustrative embodiment.

FIG. 14 is a diagram of a data model in accordance with an illustrative embodiment. Digital life conceptual data model 1400 may include, but is not limited to, the following subsystems: scenelet 1402, subscription/publication 1404, environmental 1406, theme 1408, biometric 1410, contacts 1412, index services 1414, location 1416, and project 1418.

Scenelet 1402 organizes and manages the image and sound files. Subscription/publication 1404 manages the external data feeds into and out of the digital life system, such as digital life recorder 300 shown in FIG. 3. Environmental 1406 captures and manages environmental characteristics related to the scenelet data. Theme 1408 allows users to customize and manage their digital life system interfaces and experiences. Biometric 1410 captures and manages biometric information associated with human contacts within the scenelets. Contacts 1412 is a repository of known contacts. Index services 1414 provides post processing capability to further analyze and categorize scenelet data. Location 1416 captures and manages specific location related details during a scenelet. Project 1418 provides an access management system that allows users to customize data retrieval.

Figure 15:
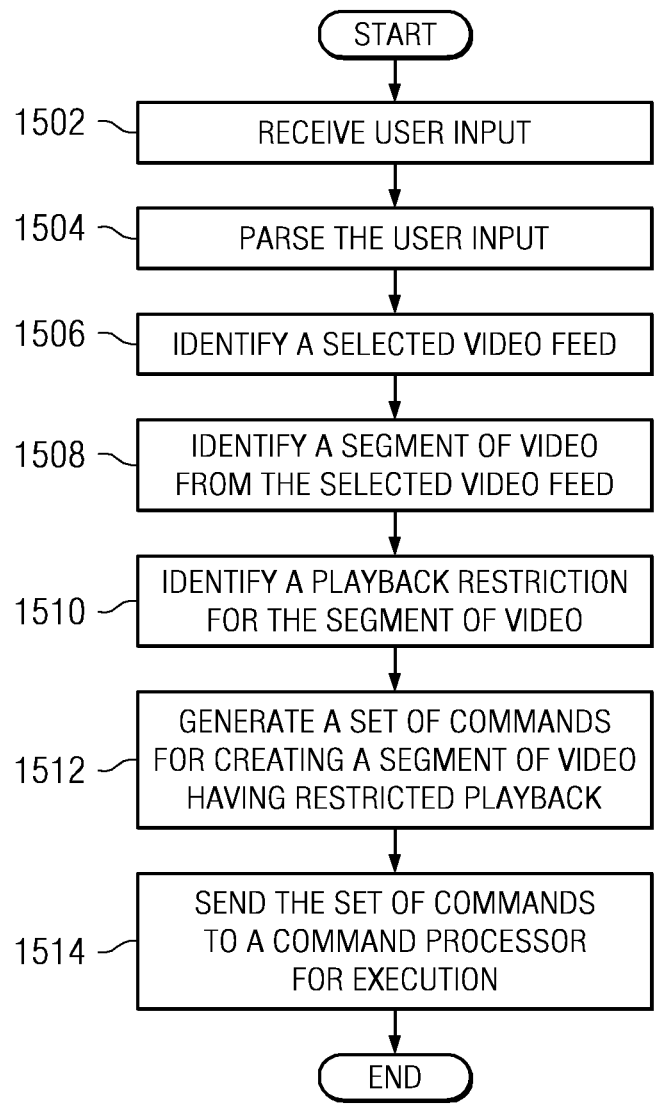
FIG. 15 is a flowchart of a process for controlling the playback of digital video recorded by a digital life recorder in accordance with an illustrative embodiment.

FIG. 15 is a flowchart of a process for controlling the playback of digital video recorded by a digital life recorder in accordance with an illustrative embodiment. The process shown in FIG. 15 may be implemented in a software component such as personal playback subsystem 610 in FIG. 6.

The process begins by receiving user input (step 1502). The process then parses the user input (step 1504). From the parsed user input, the process identifies a selected video feed (step 1506). In other embodiments, more than one video feed may be selected.

After identifying a selected video feed, the process identifies a segment of video from the selected video feed (step 1508). The process then identifies a playback restriction for the segment of video (step 1510).

Thereafter, the process generates a set of commands for creating a segment of video having a restricted playback (step 1512). The process sends the set of commands to a command processor for execution (step 1514) and the process terminates.

Figure 16:
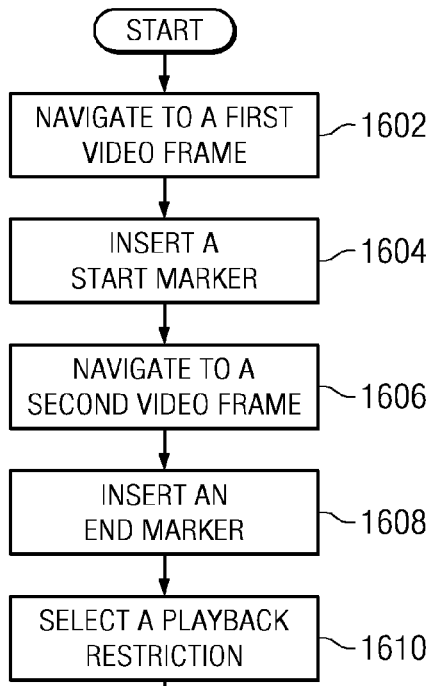
FIG. 16 is a flowchart of a process for identifying a segment of video from a selected video feed in accordance with an illustrative embodiment.

FIG. 16 is a flowchart of a process for identifying a segment of video from a selected video feed in accordance with an illustrative embodiment. The process may be implemented in a software component such as personal playback subsystem 610 in FIG. 6.

The process begins by navigating a video stream to a first video frame (step 1602). The process then inserts a start marker at the first video frame (step 1604). The process then navigates to a second video frame (step 1606). Thereafter, the process inserts an end marker (step 1608). The two markers form a segment of video, such as video segment 904 in FIG. 9. The process then selects a playback restriction (step 1610) and terminates thereafter.

Figure 17:
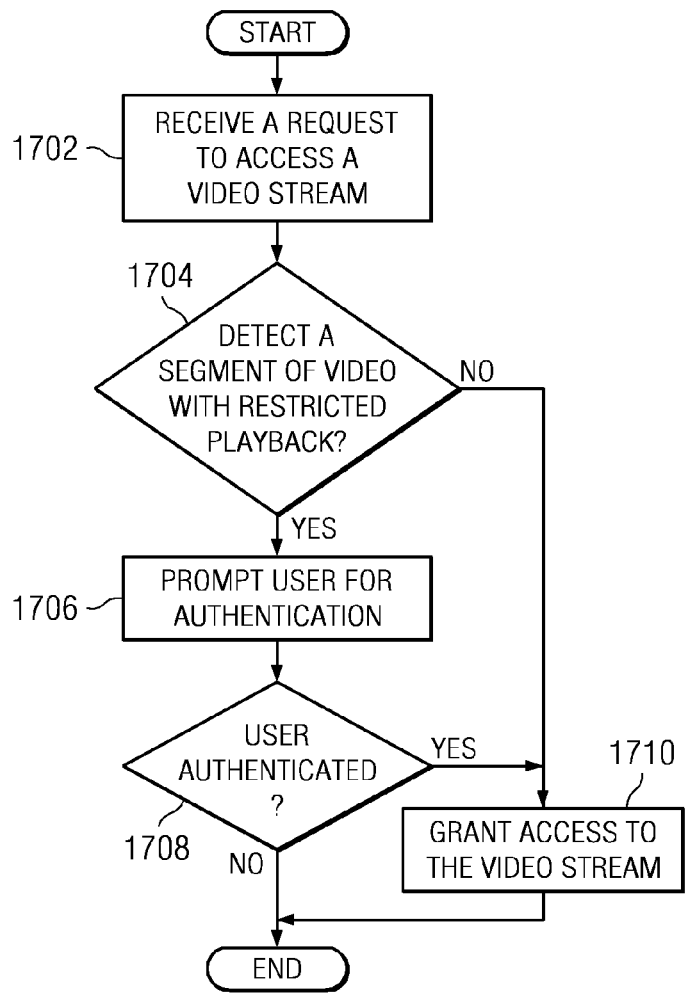
FIG. 17 is a flowchart of a process for accessing a segment of video having a restricted playback in accordance with an illustrative embodiment.

FIG. 17 is a flowchart of a process for accessing a segment of video having a restricted playback in accordance with an illustrative embodiment. The process may be implemented in a software component, such as personal playback subsystem 610 in FIG. 6.

The process begins by receiving a request to access a video stream (step 1702). The process then makes the determination as to whether a segment of video with restricted playback is detected (step 1704). If the process makes the determination that a segment of video with restricted playback is detected, then the process prompts the user for authentication (step 1706). The process then makes the determination as to whether the user is authenticated (step 1708). If the process makes the determination that the user is authenticated, then the process grants the user access to the requested video stream (step 1710) and the process terminates thereafter. However, if the process makes the determination that the user is not authenticated, then the process terminates.

Returning now to step 1704, if the process makes the determination that a segment of video with restricted playback is not detected, then the process continues to step 1710 and terminates thereafter.

Figure 18:
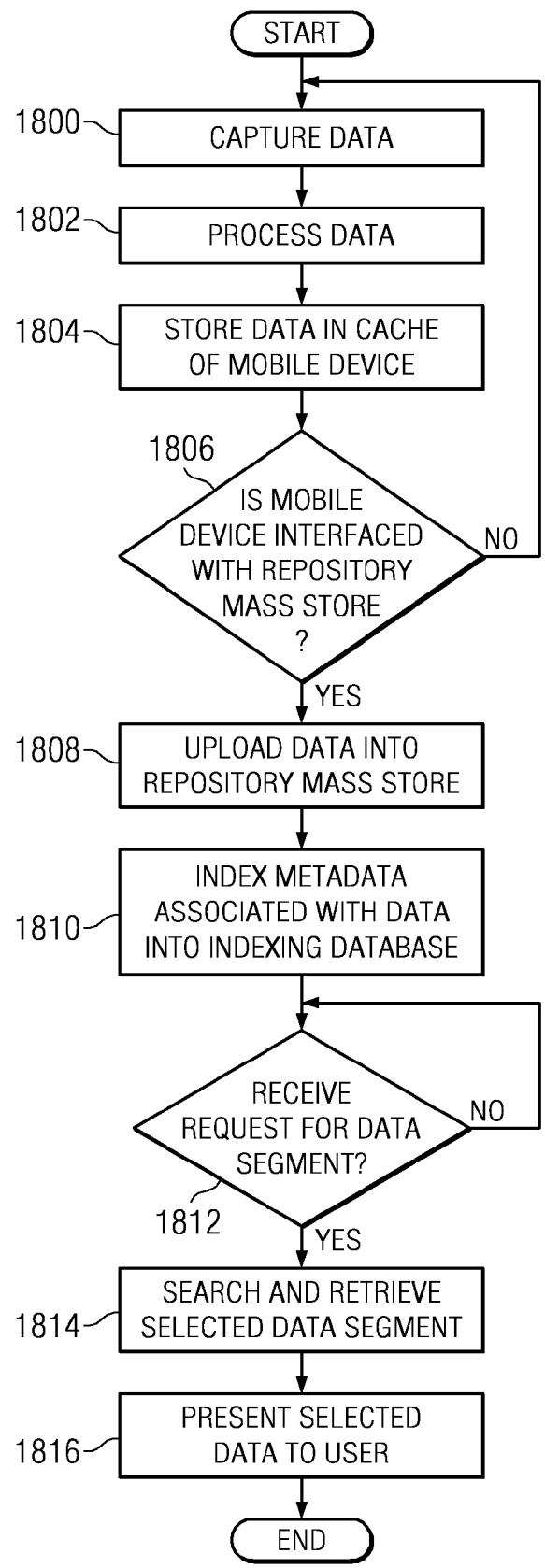
FIG. 18 is a high-level flowchart illustrating a process for capturing, storing, and presenting data in accordance with an illustrative embodiment.

With reference now to FIG. 18, a high-level flowchart is presented illustrating a process for capturing, storing, and presenting data in accordance with an illustrative embodiment. The process illustrated in FIG. 18 may be implemented in a digital life recording system, such as digital life recorder 300 shown in FIG. 3.

The process begins by capturing data associated with daily activities of a person using data capturing devices (step 1800). The captured data is processed by a mobile device associated with the person (step 1802). The data is then stored in a cache of the mobile device (step 1804). The process monitors the mobile device to determine when the mobile device is interfaced with a repository mass store (step 1806). Interfacing may occur when the mobile device is in the vicinity of the repository mass store and connection is established via a wireless transmission link. Interfacing may also occur when the mobile device is docked to a repository mass store. The process continues the process of capturing (step 1800), processing (step 1802), and storing (step 1804) the data until a determination is made that the mobile device is interfaced with a repository mass store.

In response to interfacing the mobile device to a repository mass store, the process uploads the data stored in the cache of the mobile device into the repository mass store (step 1808). Metadata associated with the data, is indexed into an indexing database (step 1810). The process monitors for a request, from a user, to retrieve a selected data segment (step 1812). In response to receiving a request for a selected data segment, the process performs a search and retrieves the selected data segment from the repository mass store (step 1814). The process presents the selected data segment to the user (step 1816), with the process terminating thereafter.

Figure 19:
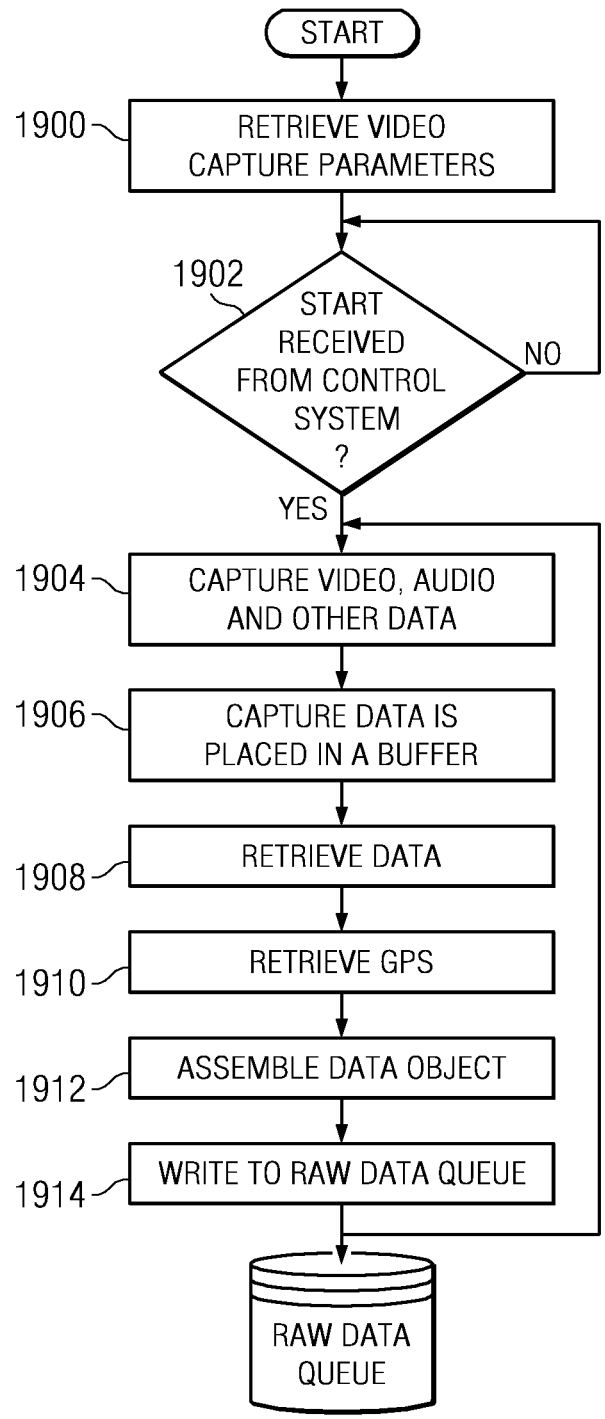
FIG. 19 is a flowchart illustrating a process for capturing life data in accordance with an illustrative embodiment.

With reference now to FIG. 19, a flowchart illustrating a process for capturing life data is depicted in accordance with an illustrative embodiment. The process illustrated in FIG. 19 may be implemented in a digital life recording system, such as digital life recorder 300 shown in FIG. 3.

The process begins by retrieving the video capture parameters (step 1900). The process monitors for start request from the control system (step 1902). In response to receiving a start request from the control system, the process captures the video, audio, and other data from the data capturing devices associated with a person (step 1904). The captured data is placed in a buffer for temporary storage (step 1906). The process retrieves data from the buffer (step 1908). Additionally, the process retrieves data associated with a global positioning system device (step 1910). The process assembles a data object by associating the data associated with a global positioning system device with the data retrieved from the buffer (step 1912). The process writes the data object to a raw data queue (step 1914). The process repeats steps 1904-1914 until all the data in the buffer is written to the raw data queue.

Figure 20:
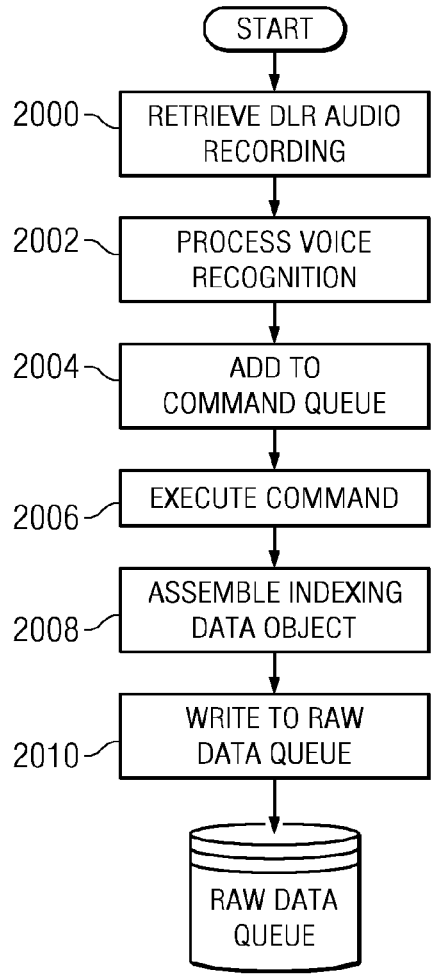
FIG. 20 is a flowchart illustrating a process for using voice commands for tagging life data objects in accordance with an illustrative embodiment.

FIG. 20 is a flowchart of a process for improving the indexing of the stored data by tagging life data objects in accordance with an illustrative embodiment. The process illustrated in FIG. 20 may be implemented in a digital life recording system, such as digital life recorder 300 shown in FIG. 3.

The process begins by retrieving audio recording associated with a digital life recording system (step 2000). The audio recording is processed through a voice recognition subsystem to interpret voice commands (step 2002). The process adds the voice commands to a command queue (step 2004). Commands may also be added to the command queue using a mouse or keyboard. The tagging command includes a timestamp and a descriptive text index tag string. The process executes the commands stored in the command queue (step 2006). The process assembles the descriptive text index tag string and timestamp into an indexing data object (step 2008). The process writes the tagged data object to a raw data queue (step 2010) for later placement into the metadata database, with the process terminating thereafter.

Figure 21:
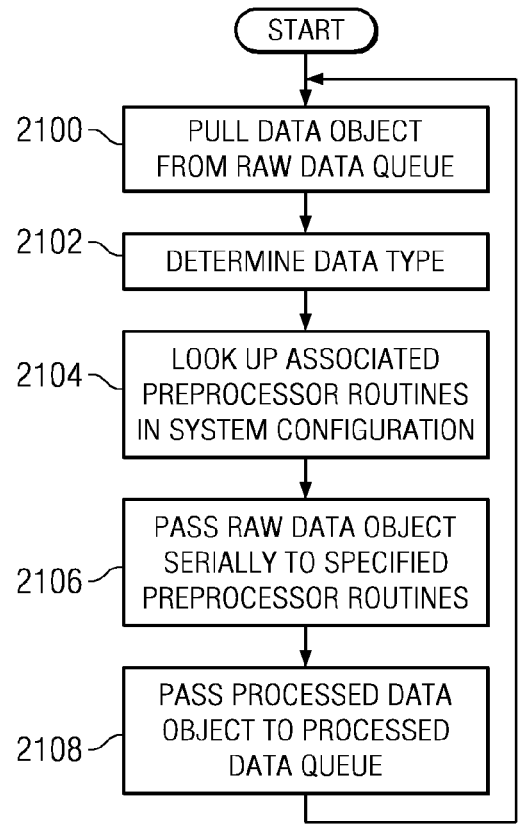
FIG. 21 is a flowchart illustrating a process for preprocessing raw recorded data in accordance with an illustrative embodiment.

FIG. 21 is a flowchart of a process for preprocessing raw recorded data in accordance with an illustrative embodiment. The process illustrated in FIG. 21 may be implemented in a digital life recording system, such as digital life recorder 300 shown in FIG. 3.

The process begins by pulling a data object from the raw data queue (step 2100). The process determines the data type of pulled data object (step 2102). The process looks up the associated preprocessor routines in system configuration (step 2104). The process passes the raw data object serially to the specified preprocessor routines (step 2106). The specified preprocessor routines return the processed data object to the process. The process then passes the processed data object to a processed data queue (step 2108). The process loops and repeats steps 2100-2108.

Figure 22:
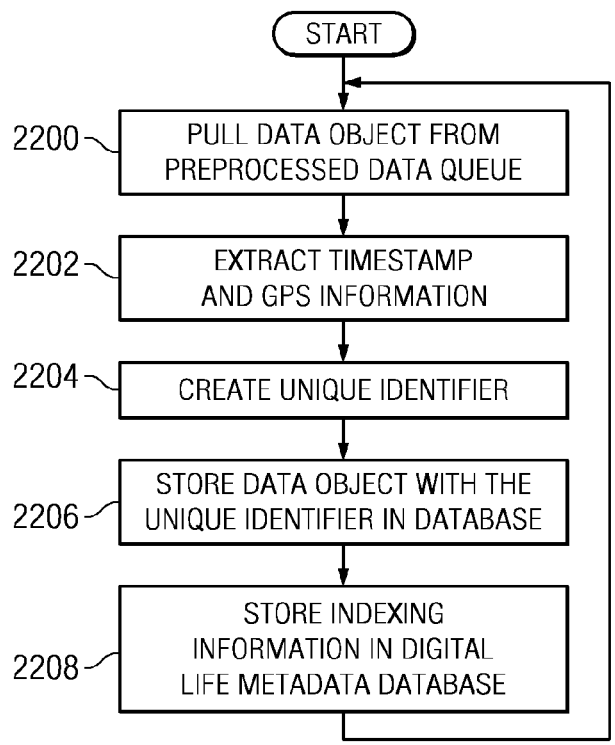
FIG. 22 is a flowchart illustrating a process for creating a unique identifier for indexing and storing data objects in accordance with an illustrative embodiment.

FIG. 22 is a flowchart of a process for creating a unique identifier for indexing and storing data objects in accordance with an illustrative embodiment. The process illustrated in FIG. 22 may be implemented in a digital life recording system, such as digital life recorder 300 shown in FIG. 3.

The process begins by pulling a data object from the preprocessed data queue (step 2200). The process extracts the timestamp and global positioning system (GPS) information from the data object (step 2202). The process creates a unique identifier for identifying the data object (step 2204). The process then stores the data object along with the unique identifier in a digital life information object storage database (step 2206), such as digital life repository information object storage 630 shown in FIG. 6. The process stores indexing information, such as, but not limited to, a timestamp, global positioning system information, the unique identifier, and the physical location of where the data object is stored in the digital life information object storage database, in a digital life repository metadata database (step 2208), such as digital life repository metadata database 1028 shown in FIG. 10. The process loops and repeats steps 2200-2208.

Figure 23:
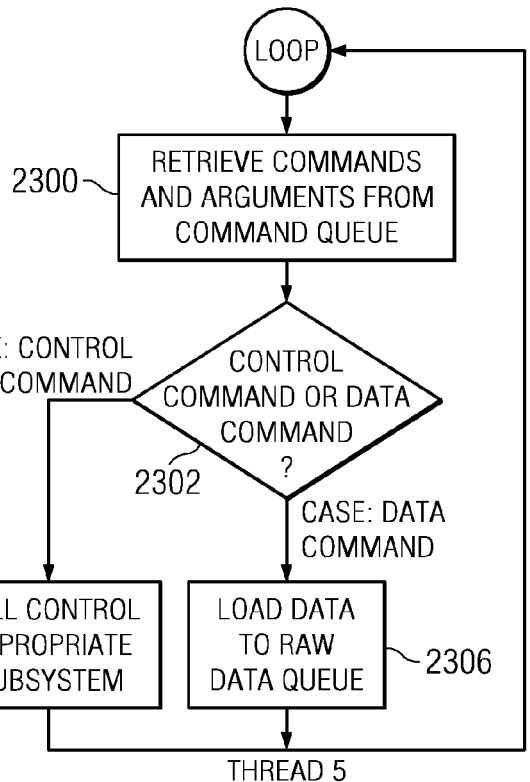
FIG. 23 is a flowchart illustrating a process for archiving data objects in accordance with an illustrative embodiment.

FIG. 23 is a flowchart of a process for archiving data objects in accordance with an illustrative embodiment. The process illustrated in FIG. 23 may be implemented in a digital life recording system, such as digital life recorder 300 shown in FIG. 3.

The process begins by determining a set of archive ready information stored in the daily cache of a mobile device (DLR system) (step 2300). The mobile device is associated with a person being recorded. The archive ready information comprises of the stored data objects, metadata, and other data associated with the captured data. The process adds the set of archive ready information to a data queue (step 2302). The process loops and repeats the steps of determining (step 2300) and adding (step 2302) archive ready information to a data queue until there is no more archive ready information.

In response to the mobile device interfacing with a repository mass store, the process retrieves the set of archive ready information from the data queue (step 2304). The process inserts the set of archive ready information into the repository mass store, such as repository database 1008 shown in FIG. 10. The process then adds a completion message to a message queue (step 2306). The process loops and repeats the steps of retrieving (step 2304) and inserting (step 2306) archive ready information into the repository mass store until all archive ready information is stored in the repository mass store.

The process receives completion messages from the message queue (step 2308). In response to receiving the completion messages from the message queue, the process deletes the set of archive ready information from the daily cache (step 2310). The process loops and repeats the steps of receiving completion messages from the message queue (step 2308) and deleting the set of archive ready information from the daily cache (step 2310).

Figure 24:
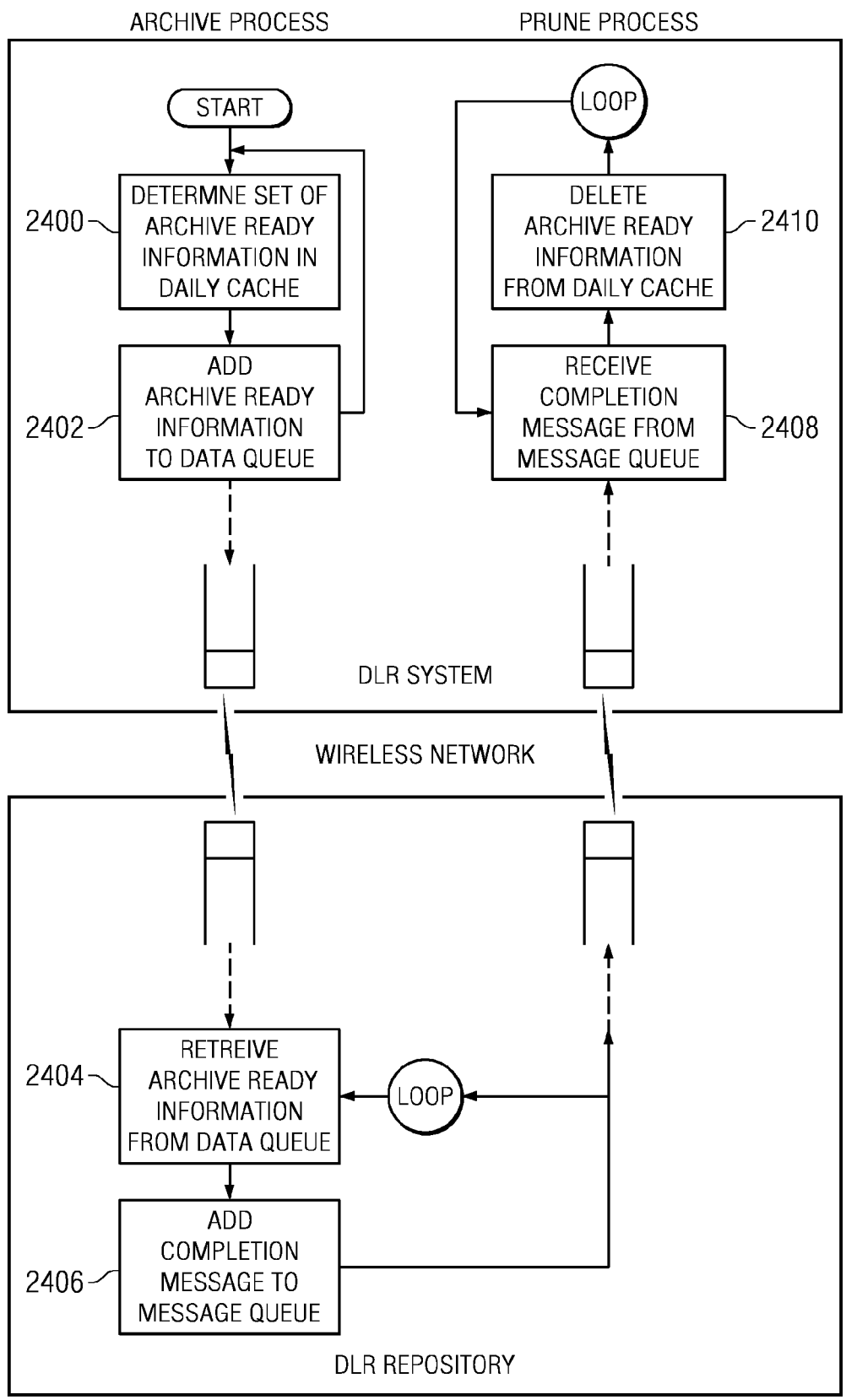
FIG. 24 illustrates different processes for adding commands to a command queue in accordance with an illustrative embodiment.

FIG. 24 is illustrates different processes for adding commands to a command queue in accordance with an illustrative embodiment. The processes illustrated in FIG. 24 may be implemented in a digital life recording system, such as digital life recorder 300 shown in FIG. 3.

In process 2400, a keyboard handler monitors keystrokes for commands (step 2402). In response to detecting a command, the detected command along with the associated arguments is placed on the command queue (step 2404). Process 2400 loops and continues monitoring (step 2402) and adding detected commands (step 2404) to the command queue.

In process 2406, a voice recognition subsystem monitors the sound channels for commands (step 2408). In response to detecting a command, the detected command along with the associated arguments is placed on the command queue (step 2410). Process 2406 loops and continues monitoring (step 2408) and adding detected commands (step 2410) to the command queue.

In process 2412, a wireless network subsystem monitors the ports for commands (step 2414). In response to detecting a command, the detected command along with the associated arguments is placed on the command queue (step 2416). Process 2412 loops and continues monitoring (step 2414) and adding detected commands (step 2416) to the command queue.

In process 2418, a script processing subsystem executes scheduled scripts and monitors for commands (step 2420). In response to detecting a command, the detected command along with the associated arguments is placed on the command queue (step 2422). Process 2418 loops and continues monitoring (step 2420) and adding detected commands (step 2422) to the command queue.

Figure 25:
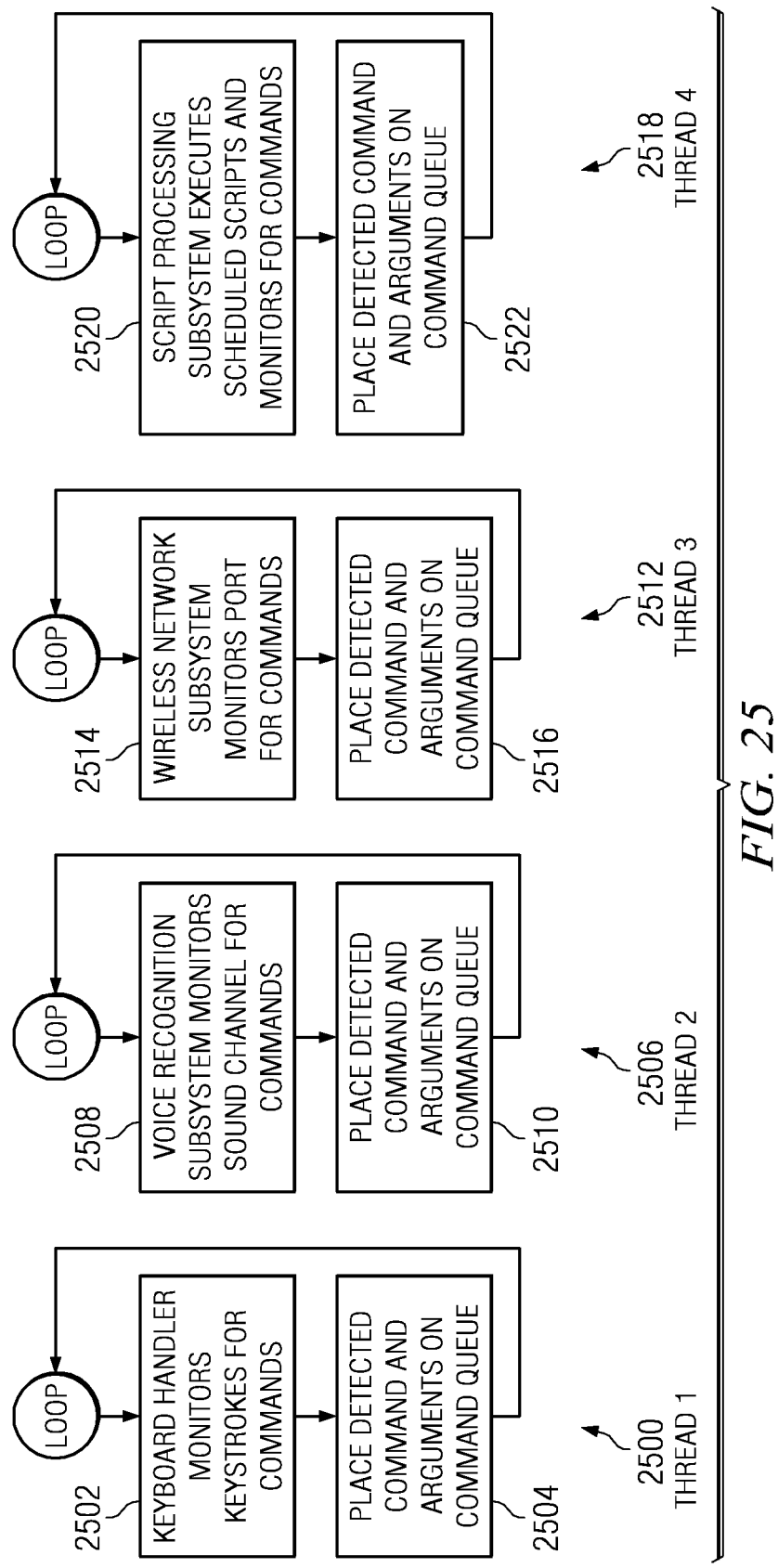
FIG. 25 is a flowchart illustrating a process for processing commands in accordance with an illustrative embodiment.

With reference to FIG. 25, a flowchart a process for processing commands is depicted in accordance with an illustrative embodiment. The process illustrated in FIG. 25 may be implemented in a digital life recording system, such as digital life recorder 300 shown in FIG. 3.

The process begins by retrieving commands and their associated arguments from a command queue (step 2500), such as command queue 512 shown in FIG. 5. The process interprets the retrieved command to determine if the retrieved command is a control command or a data command (step 2502). A control command is a command that modifies the operation of the digital life recording system. A data command is command request to select data associated with the digital life recording system.

In response to determining that the retrieved command is a control command, the process calls the control appropriate subsystem for processing the command (step 2504). In response to determining that the retrieved command is a data command, the process loads selected data to the raw data queue (step 2506). The process loops and repeats steps 2500-2506 for all commands in the command queue.

Figure 26:
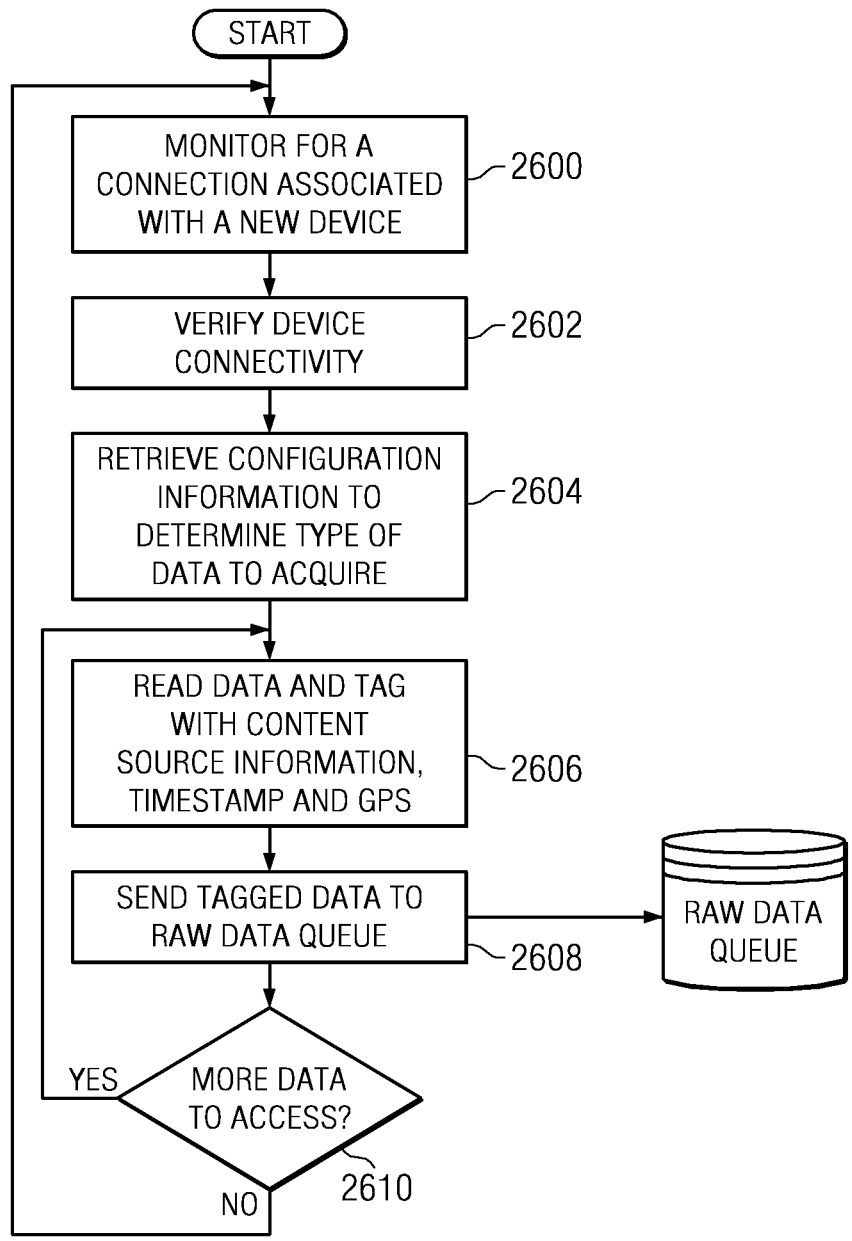
FIG. 26 is a flowchart illustrating a process for acquiring and organizing personal device data in accordance with an illustrative embodiment.

With reference to FIG. 26, a flowchart illustrating a process for acquiring and organizing personal device data is depicted in accordance with an illustrative embodiment. The process illustrated in FIG. 26 may be implemented in a digital life recording system, such as digital life recorder 300 shown in FIG. 3.

The process begins by monitoring for a connection associated with a new device (step 2600). The connection may be established either wirelessly, such as, but not limited to, Bluetooth enabled devices, or the connection may be established through a physical connection, such as, but not limited to, universal serial bus (USB) devices. The devices may include, but are not limited to, cellular phones, personal digital assistants (PDAs), and digital cameras. Responsive to detecting a connection, the process verifies the device connectivity (step 2602).

The process retrieves configuration information to determine the type of data to acquire from the connected device (step 2604). The process then reads data from the connected device(s) and tags the data with the content source information, a timestamp and global positioning system location (step 2606). The process sends the tagged data to the raw data queue (step 2608). The process determines whether more data exists in the connected device (step 2610). In response to a determination that more data exists in the connected device, the process repeats the steps of reading and tagging the data (step 2606), and sending the tagged data to the raw data queue (step 2608). In response to a determination that more data does not exist in the connected device, the process returns to the step of monitoring for a connection associated with a new device (step 2600).

Figure 27:
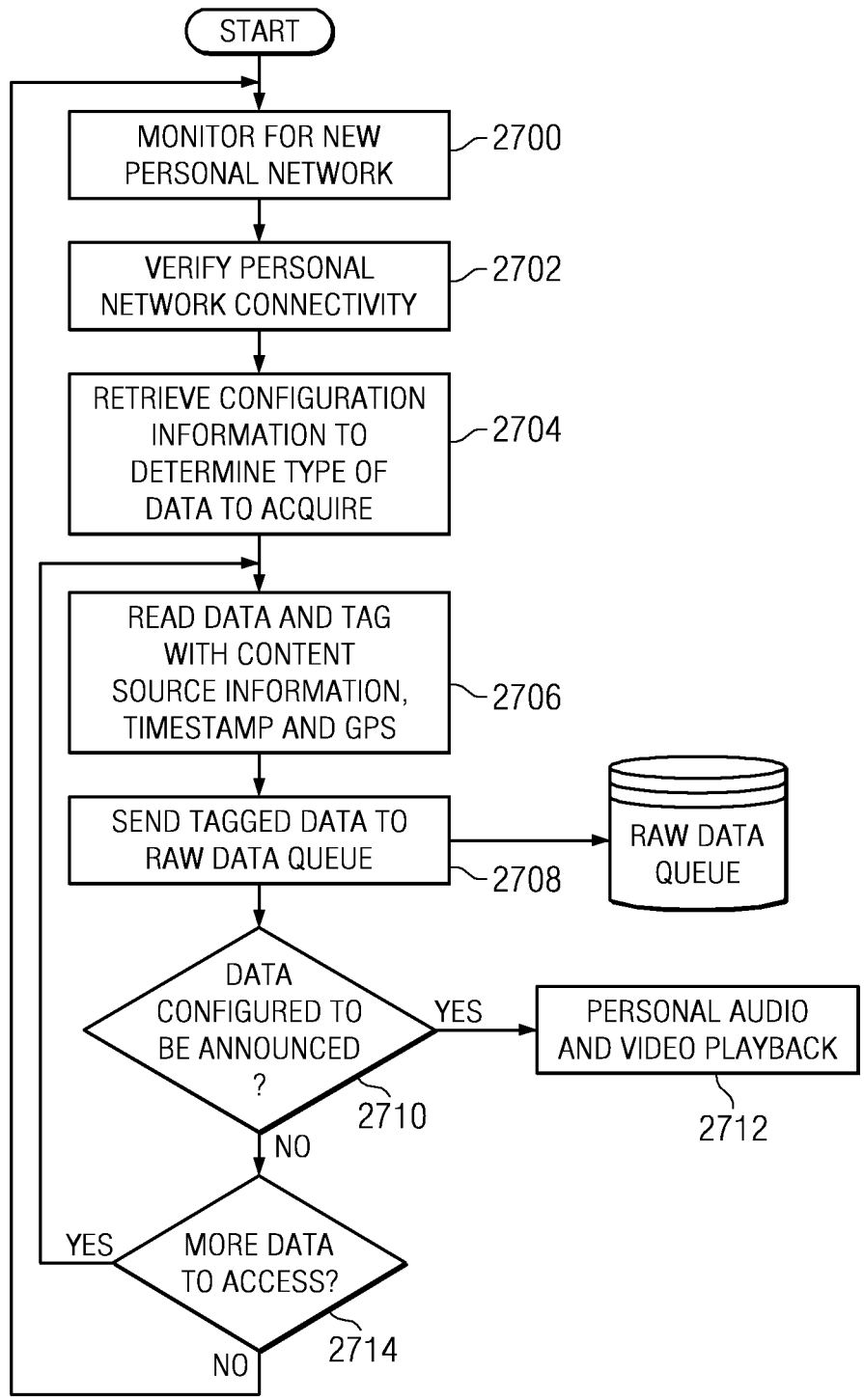
FIG. 27 is a flowchart illustrating a process for acquiring and organizing personal network data in accordance with an illustrative embodiment.

FIG. 27 is a flowchart of a process for acquiring and organizing personal network data in accordance with an illustrative embodiment. The process illustrated in FIG. 27 may be implemented in a digital life recording system, such as digital life recorder 300 shown in FIG. 3.

The process begins by monitoring for a connection associated with a new personal network (step 2700). The connection may be established either by wired or wireless means. In response to detecting a connection, the process verifies the personal network connectivity (step 2702). The process retrieves configuration information to determine the type of data to acquire from the connected personal network (step 2704).

The process then reads data from the connected personal network and tags the data with the content source information, a timestamp and global positioning system location (step 2706). The process sends the tagged data to the raw data queue (step 2708).

The process determines whether the data is configured to be announced (step 2710). Responsive to a determination that the data is configured to be announced, the data is forwarded to a personal audio and video playback subsystem for announcing the data to the person (step 2712). The process determines whether more data exists in the connected personal network (step 2714).

In response to a determination that more data exists in the connected personal network, the process repeats the steps of reading and tagging the data (step 2706), sending the tagged data to the raw data queue (step 2708), and determining whether the data is configured to be announced (step 2710). In response to a determination that more data does not exist in the connected personal network, the process returns to the step of monitoring for a connection associated with a new personal network (step 2700).

Figure 28:
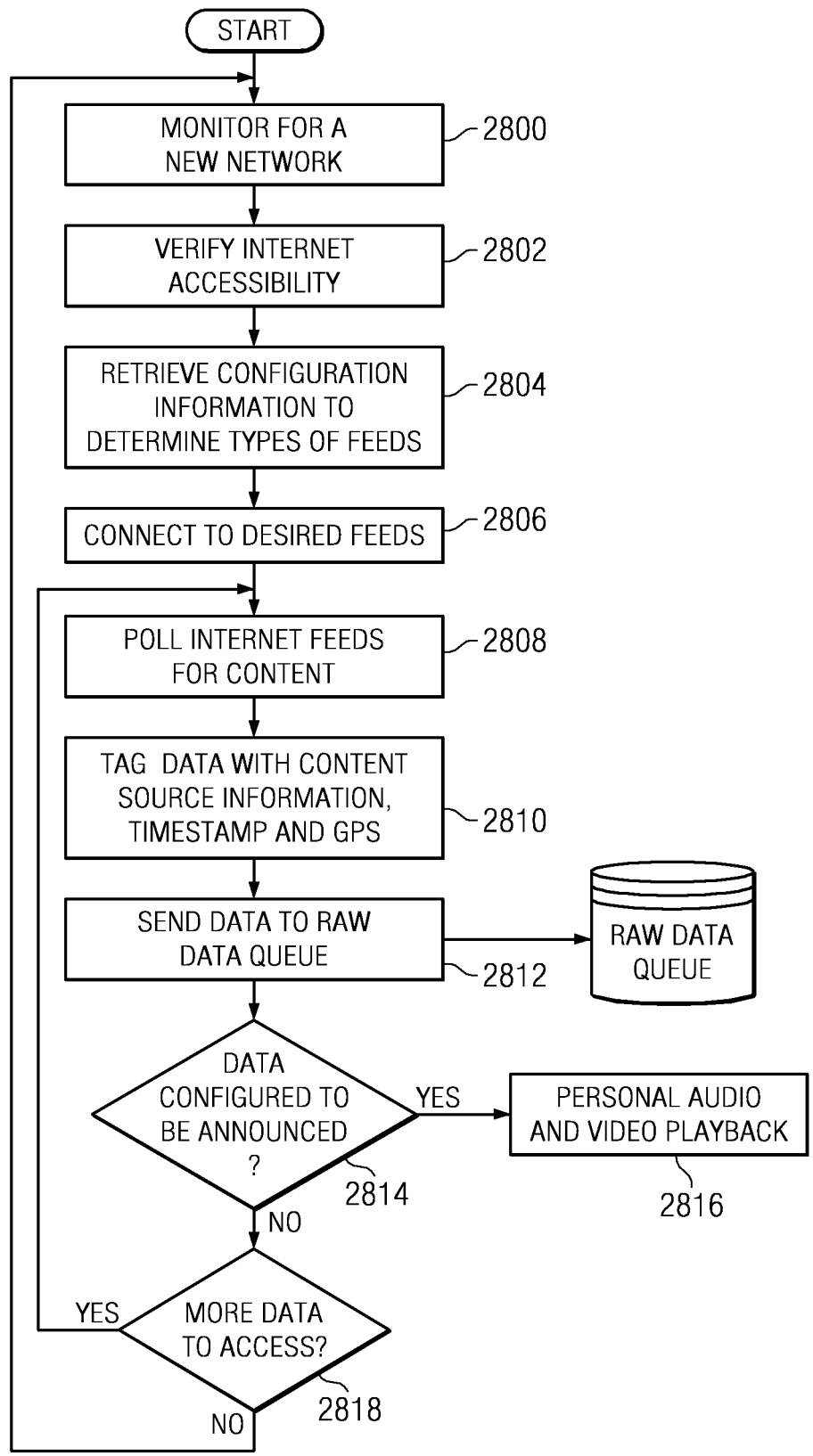
FIG. 28 is a flowchart illustrating a process for acquiring and organizing data from the internet in accordance with an illustrative embodiment.

FIG. 28 is a flowchart of a process for acquiring and organizing data from the Internet in accordance with an illustrative embodiment. The process illustrated in FIG. 28 may be implemented in a digital life recording system, such as digital life recorder 300 shown in FIG. 3.

The process begins by monitoring for a connection associated with a new network (step 2800). The connection may be established either by wired or wireless means. In response to detecting a connection, the process verifies internet accessibility (step 2802). The process then retrieves configuration information to determine the types of feeds to acquire (step 2804). A feed is data created by a party and broadcast over the internet to others. The process connects to the desired feeds (step 2806) and polls the internet feeds for content (step 2808). In response to receiving data/content from the internet feeds, the data is tagged with the content source information, a timestamp and global positioning system location (step 2810). The process sends the tagged data to the raw data queue (step 2812).

The process determines whether the data is configured to be announced (step 2814). Responsive to a determination that the data is configured to be announced, the data is forwarded to a personal audio and video playback subsystem for announcing the data to the person (step 2816). The process determines whether more data exists in the connected internet feeds (step 2812).

In response to a determination that more data exist in the connected internet feeds, the process repeats the steps of polling (step 2808) and tagging the data (step 2810), sending the tagged data to the raw data queue (step 2812), and determining whether the data is configured to be announced (step 2814). In response to a determination that more data does not exist in the connected internet feeds, the process returns to the step of monitoring for a connection associated with a new network (step 2800).

Figure 29:
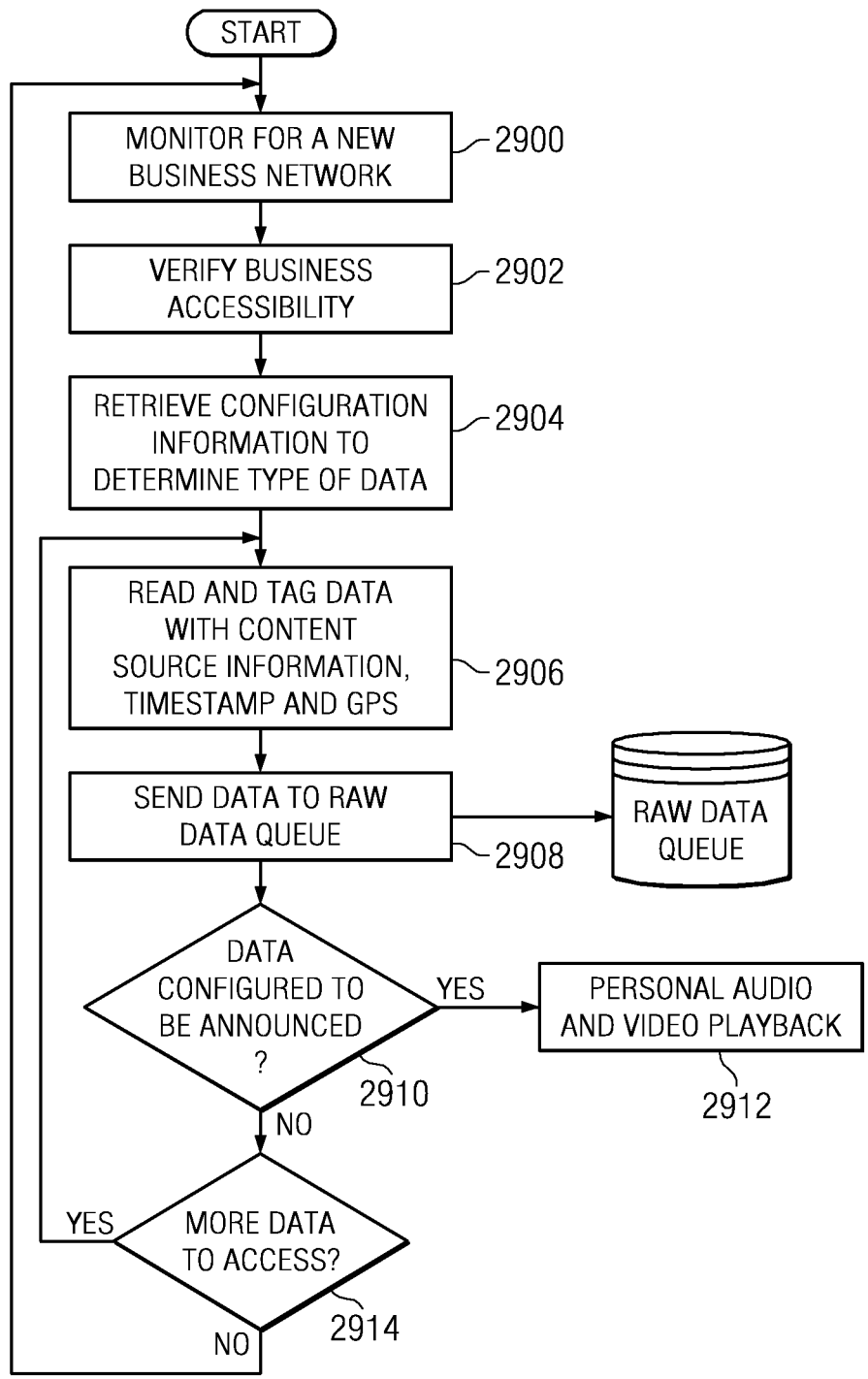
FIG. 29 is a flowchart illustrating a process for acquiring and organizing data from business networks in accordance with an illustrative embodiment.

FIG. 29 is a flowchart of a process for acquiring and organizing data from business networks in accordance with an illustrative embodiment. The process illustrated in FIG. 29 may be implemented in a digital life recording system, such as digital life recorder 300 shown in FIG. 3.

The process begins by monitoring for a connection associated with a new business network (step 2900). The connection may be established either by wired or wireless means. In response to detecting a connection, the process verifies the business network connectivity (step 2902). The process retrieves configuration information to determine the type of data to acquire from the connected business network (step 2904). The process then reads data from the connected business network and tags the data with the content source information, a timestamp and global positioning system location (step 2906). The process sends the tagged data to the raw data queue (step 2908).

The process determines whether the data is configured to be announced (step 2910). Responsive to a determination that the data is configured to be announced, the data is forwarded to a personal audio and video playback subsystem for announcing the data to the person (step 2912). The process determines whether more data exist in the connected business network (step 2914).

In response to a determination that more data exists in the connected business network, the process repeats the steps of reading and tagging the data (step 2906), sending the tagged data to the raw data queue (step 2908), and determining whether the data is configured to be announced (step 2910). In response to a determination that more data does not exist in the connected business network, the process returns to the step of monitoring for a connection associated with a new business network (step 2900).

Figure 30:
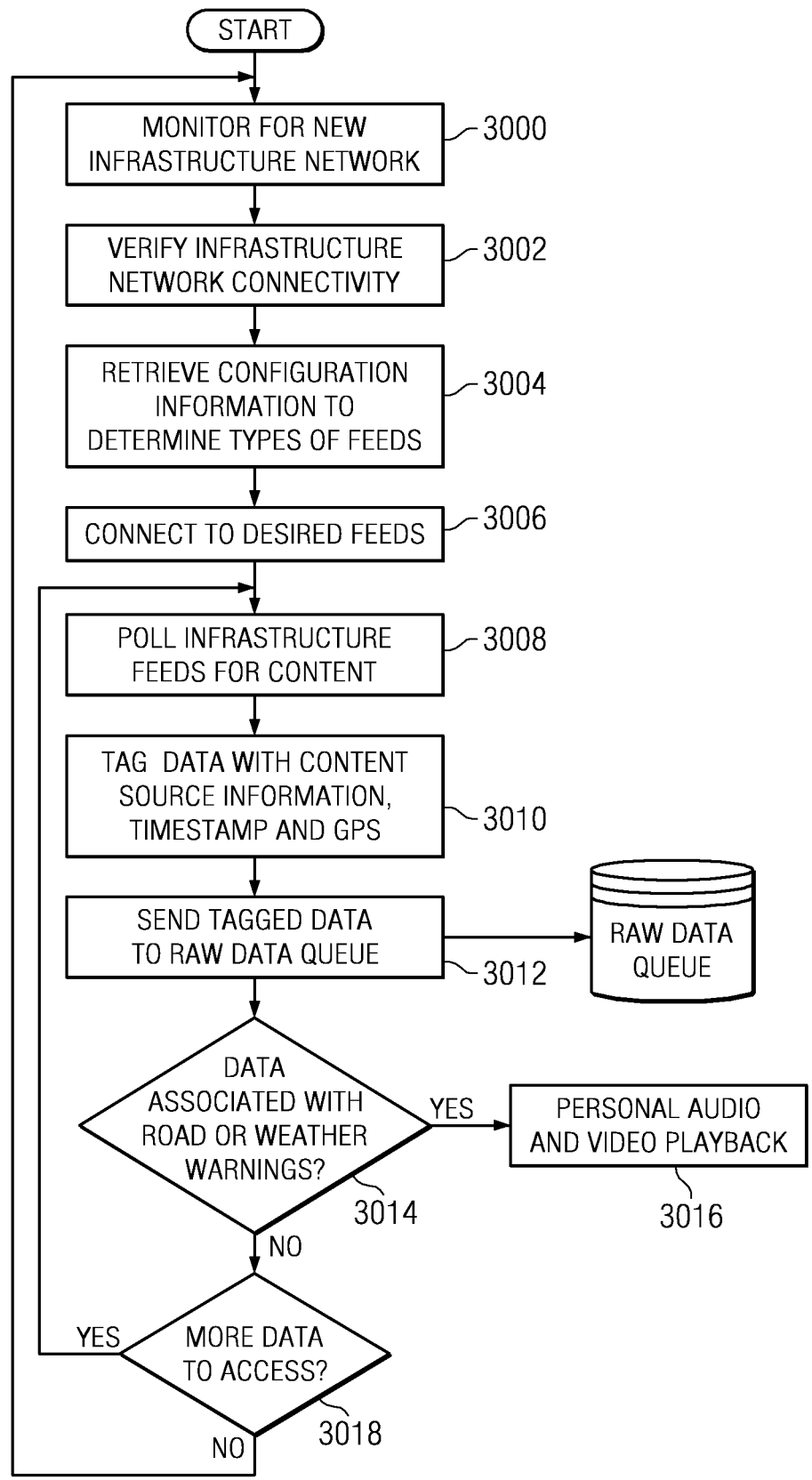
FIG. 30 is a flowchart illustrating a process for acquiring and organizing data from infrastructure networks in accordance with an illustrative embodiment.

FIG. 30 is a flowchart of a process for acquiring and organizing data from infrastructure networks in accordance with an illustrative embodiment. The process illustrated in FIG. 30 may be implemented in a digital life recording system, such as digital life recorder 300 shown in FIG. 3.

The process begins by monitoring for a connection associated with a new infrastructure network (step 3000). The connection may be established either by wired or wireless means. In response to detecting a connection, the process verifies infrastructure network connectivity (step 3002). The process then retrieves configuration information to determine the types of feeds to acquire (step 3004). The types of feeds may include, but are not limited to, feeds containing data associated with weather conditions and feeds containing data associated with road conditions.

The process connects to the desired feeds (step 3006) and polls the infrastructure feeds for content (step 3008). In response to receiving data/content from the infrastructure feeds, the data is tagged with the content source information, a timestamp and global positioning system location (step 3010). The process sends the tagged data to the raw data queue (step 3012).

The process determines whether the retrieved data contains data associated with road warnings or weather warnings related to the current location of the person (step 3014). In response to a determination that the retrieved data contains data associated with road warnings or weather warnings related to the current location of the person, the road warning/weather warning is sent to a personal audio and video playback subsystem for announcing the warning(s) to the person (step 3016).

The process determines whether more data exists in the connected infrastructure feeds (step 3018). In response to a determination that more data exists in the connected infrastructure feeds, the process repeats the steps of polling (step 3008) and tagging the data (step 3010), sending the tagged data to the raw data queue (step 3012), and determining whether the data contains data associated with road warnings or weather warnings related to the current location of the person (step 3014).

In response to a determination that more data does not exist in the connected infrastructure feeds, the process returns to the step of monitoring for a connection associated with a new infrastructure network (step 3000).

Figure 31:
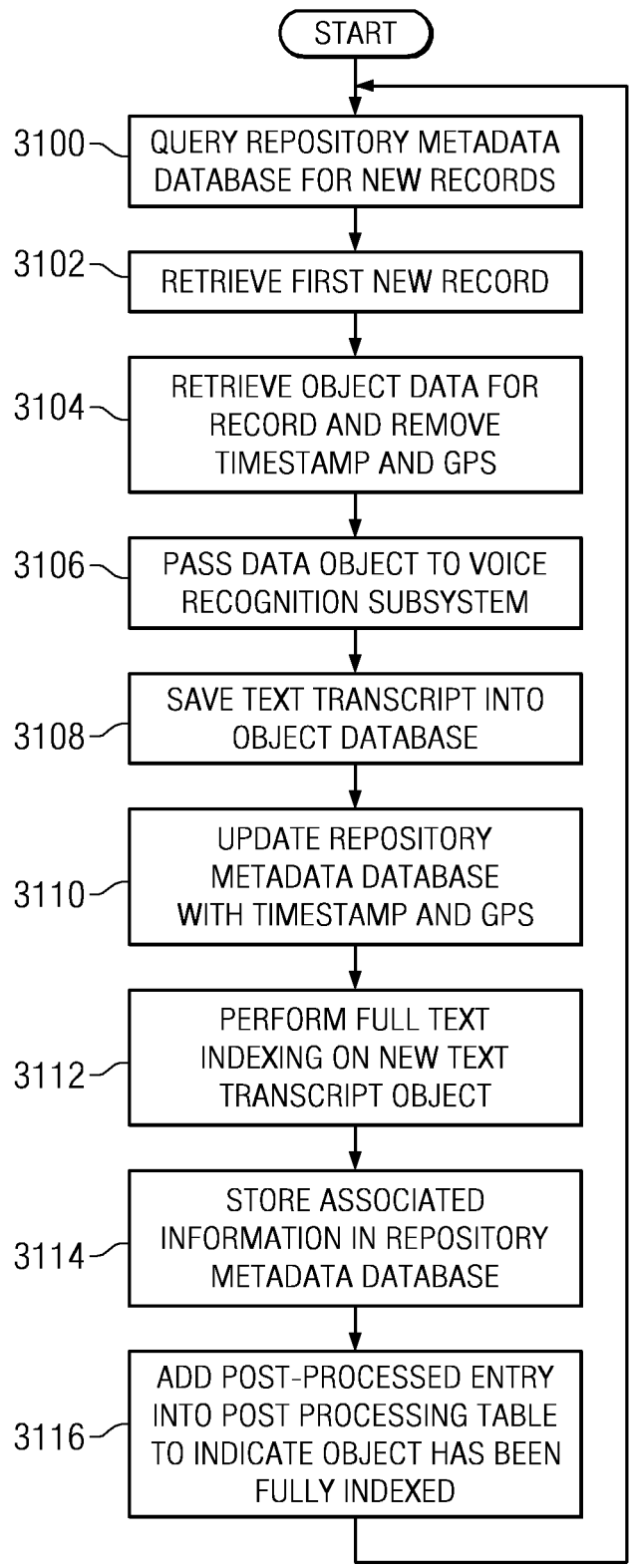
FIG. 31 is a flowchart illustrating a process for indexing data stored in the repository mass store in accordance with an illustrative embodiment.

With reference now to FIG. 31, a flowchart of a process for improving the indexing of data stored in the repository mass store is depicted in accordance with an illustrative embodiment. The process illustrated in FIG. 31 may be implemented in a digital life recording system, such as digital life recorder 300 shown in FIG. 3.

The process begins by querying a repository metadata database, such as digital life metadata database 538 shown in FIG. 5, for new records (step 3100). In response to a determination that new records exist, the process retrieves the first new record (step 3102). The process retrieves the object data associated with the new record and retrieves the global positioning system (GPS) timestamp and location from the object data (step 3104). The process passes the data object to a voice recognition subsystem to generate a text transcript of the object data. (step 3106).

The process saves the text transcript into an object database (step 3108), such as digital life information object database 540 shown in FIG. 5. The process then updates the repository metadata database with the global positioning system (GPS) timestamp and location, a unique identifier that points to the physical location of the text object (step 3110). The process then performs full text indexing on the new text transcript object (step 3112). The process stores the information associated with the full text indexing in the repository metadata database (step 3114). The process adds a post-processed entry, for the text transcript object, into a post processing table to indicate that the associated text transcript object has been fully indexed (step 3116). The process loops and queries the repository metadata database for a new record (step 3100).

Figure 32:
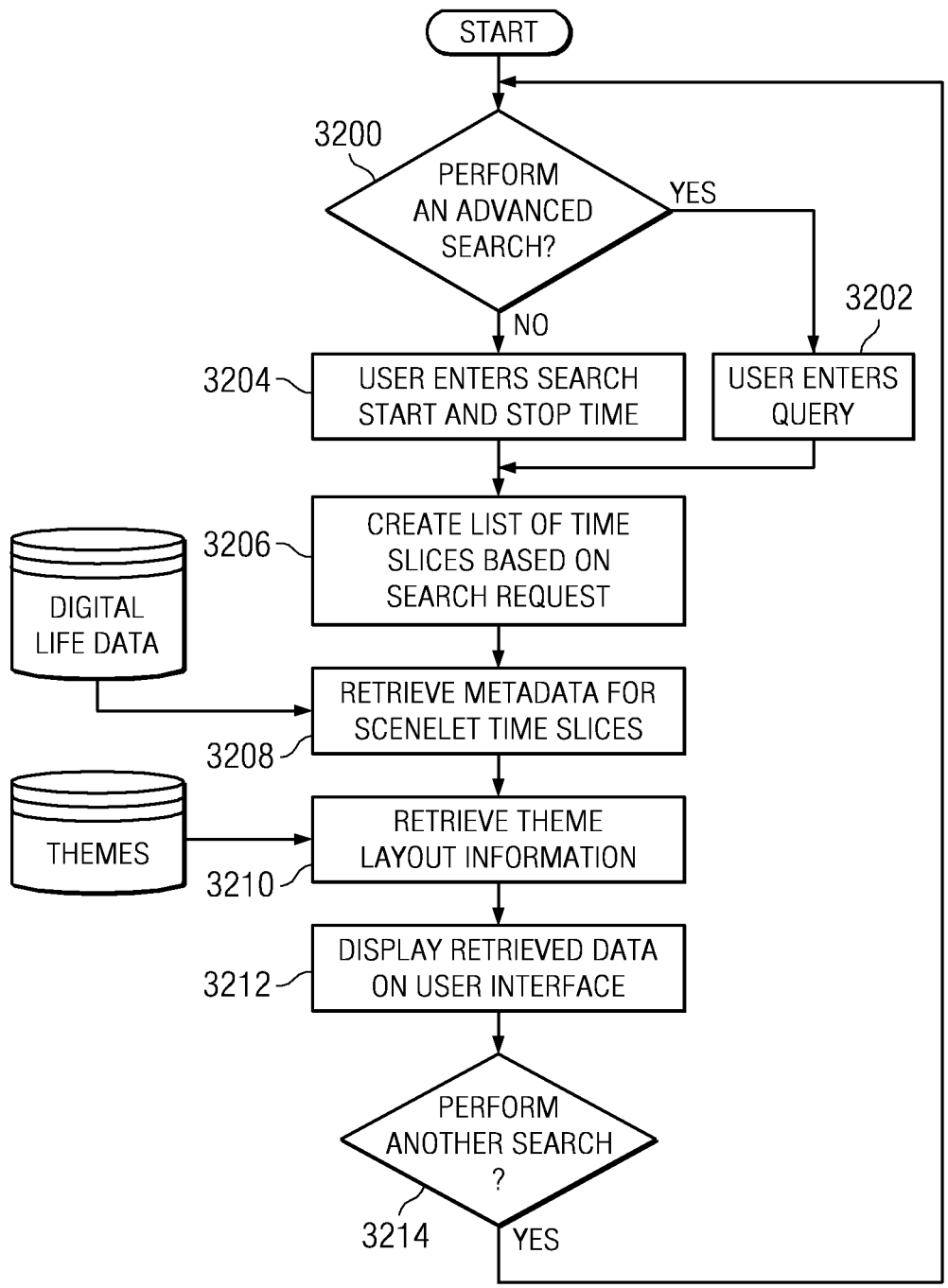
FIG. 32 is a flowchart illustrating a process for searching, retrieving, and rendering data in accordance with an illustrative embodiment.

With reference now to FIG. 32, a flowchart of a process for searching, retrieving, and rendering data is depicted in accordance with an illustrative embodiment. The process illustrated in FIG. 32 may be implemented in a digital life recording system, such as digital life recorder 300 shown in FIG. 3.

The process begins by determining whether the user has selected an option to perform an advance search (step 3200). In an advance search, the process receives a query request from a user to query the repository database (step 3202). The query uses a database querying language, such as, but not limited to, structured query language (SQL). For a regular search, the process receives a request from a user containing a starting date/time and an ending date/time (step 3204). The process creates a list of time slices based on the search request (step 3206).

The process retrieves metadata for the scenelet time slices from a digital life data repository (step 3208), such as digital life data repository 1204 shown in FIG. 12. The process also retrieves metadata for non-video information, such as, but not limited to, audio and temperature. The process then retrieves theme layout information from a themes database (step 3210), such as themes database 1218 shown in FIG. 12. The process displays the retrieved data on a user interface (step 3212), such as user interface 900 shown in FIG. 9. The process then determines whether another search request is to be performed (step 3214). In response to determining that another search request is to be performed, the process loops back to step 3200.

Figure 33:
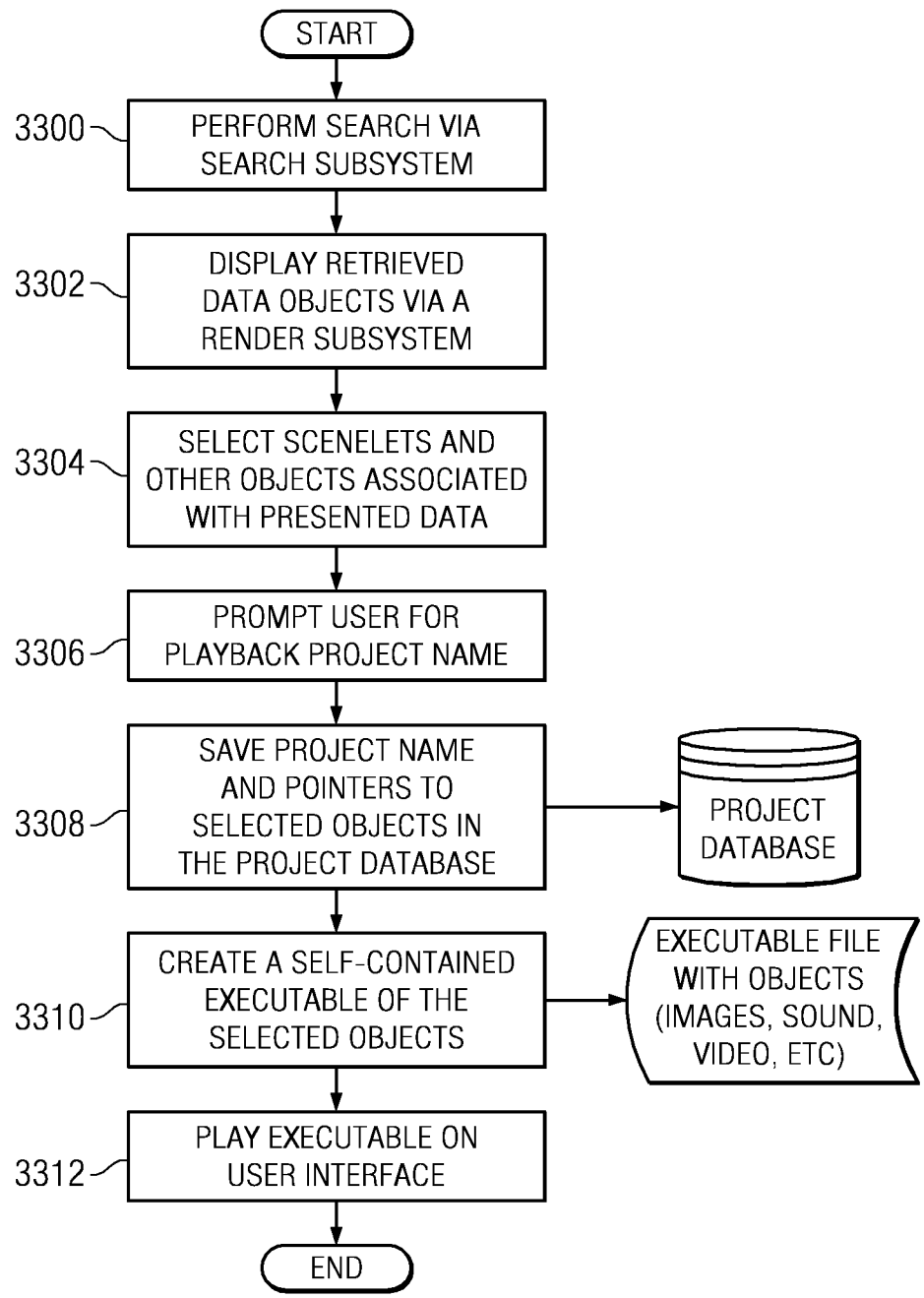
FIG. 33 is a flowchart illustrating a process for organizing and presenting data in accordance with an illustrative embodiment.

With reference now to FIG. 33, a flowchart of a process for organizing and presenting data is depicted in accordance with an illustrative embodiment. The process illustrated in FIG. 33 may be implemented in a digital life recording system, such as digital life recorder 300 shown in FIG. 3.

The process begins by performing a search for data objects via a search subsystem (step 3300), such as search subsystem 1212 shown in FIG. 12. The process displays the retrieved data objects via a render subsystem (step 3302), such as render subsystem 1214 shown in FIG. 12. The process selects scenelets and other objects associated with presented data (step 3304).

The process then prompts a user for a playback project name (step 3306). In response to receiving a project name from a user, the process saves the project name and pointers to the selected objects in a project definitions database (step 3308), such as project definitions database 1258 shown in FIG. 12. A pointer is a variable that holds the address of a data object or function.

The process then creates a self-contained executable of the selected objects (step 3310). The self-contained executable may be emailed, posted to a web-site, or saved in non-volatile memory, such as on a hard drive. In response to a receiving a request to execute the self-contained executable of the selected objects, the process plays the self-contained executable on a user interface (step 3312), such as user interface 1300 shown in FIG. 13.

Thus, the illustrative embodiments described herein provide a computer-implemented method, apparatus, and computer program product for controlling the playback of video recorded by a sensing subsystem of a digital life recorder. In one embodiment, the process identifies a selected video feed recorded by a camera of a sensing subsystem responsive to receiving user input. The process then identifies a segment of video from the selected video feed using a personal computing device communicating with a digital life recorder, wherein the digital life recorder records the selected video feed. The process identifies a playback restriction associated with the segment of video and generates a set of commands for restricting playback of the segment of video. Thereafter, the process sends the set of commands to a command processor for execution The recording of events experienced by users of a digital life recorder may result in the potential to record events that the user may consider to be private or confidential. Restricting the playback of recorded video enables the user to control the dissemination of recorded video. Access to the restricted video may be granted to authorized viewers. Authorized viewers may also remove restrictions on otherwise restricted video to allow all viewers to have access to a previously restricted segment of video.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product including a computer usable or computer-readable medium storing program code for use by or in connection with a computer or any instruction execution system.

It is important to note that while the present invention has been described in the context of a fully functioning data processing system, those of ordinary skill in the art will appreciate that the processes of the present invention are capable of being distributed in the form of a computer-readable medium embodying tangible instructions and a variety of forms and that the present invention applies equally regardless of the particular type of signal bearing media actually used to carry out the distribution.

Examples of computer-readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer-readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for controlling playback of information recorded by a digital recorder, the computer-implemented method comprising:
    receiving input from a plurality of data capturing devices of a sensing subsystem of the digital recorder, wherein the input comprises a plurality of video feeds from a plurality of video cameras, each of the plurality of video cameras corresponding to one of a plurality of camera views;
    identifying a segment of video from at least one video feed of the plurality of video feeds using a personal computing device communicating with the digital recorder;
    tagging the data segment with a timestamp of when the data segment was captured, and a location of where the data segment was captured, wherein the tagging further comprises:
        identifying the data with at least one of a content source information, a timestamp and a global positioning system location;
        forwarding the identified data to a raw data queue;
        determining whether the retrieved data is configured; and
        responsive to determining that the retrieved data is configured, announcing the retrieved data to a audio and video playback subsystem;
    recording the identified segment of video in a repository subsystem of the digital recorder;
    subsequent to recording the identified segment of video in the repository subsystem of the digital recorder, selecting one of the plurality of camera views for viewing restriction;

responsive to the data segment being received from a video camera corresponding to the viewing restriction, enabling a restriction for a playback option for the segment of video for the one of the plurality of camera views selected for viewing restriction; and responsive to enabling a restriction, generating a set of commands that implements the restriction of the playback option.

2. The computer-implemented method of claim 1, wherein the identifying a segment of video from the selected video feed comprises:
   creating a video segment, the creating comprising:
      inserting a start marker in a first video frame of a video stream of a video feed recorded by a camera of a sensing subsystem; and
      inserting a stop marker in a second video frame of the video stream of the video feed.

3. The computer-implemented method of claim 2, wherein inserting a start marker is performed by selecting an option from a menu.

4. The computer-implemented method of claim 1, wherein enabling a restriction comprises selecting an option from a set of menu options consisting of deleting, blurring, hiding and marking as private.

5. The computer-implemented method of claim 4, wherein enabling a restriction comprises enabling an option selected from the set of menu options during the recording of the identified video segment.

6. The computer-implemented method of claim 1, further comprising:
   detecting the enabled restriction of the playback option for the video segment;
   responsive to detecting the restriction, requiring an authentication to access the playback option; and
   responsive to a successful authentication, granting access to the restricted playback option.

7. The computer-implemented method of claim 1, wherein generating the set of commands is performed by a user.

8. The computer-implemented method of claim 1, further comprising:
   monitoring a network of an infrastructure for a connection;
   verifying the infrastructure network connection;
   determining, based on a configuration information, a type of feed to acquire from a plurality of feeds;
   retrieving data from the determined type of feed; and
   tagging the retrieved data.

9. The computer-implemented method of claim 8, wherein the connection is one of a wired and wireless connection.

10. The computer-implemented method of claim 8, wherein identifying a segment of video comprising selecting data based on a date and time range.

11. The computer-implemented method of claim 1, further comprising selecting a camera view for restriction prior to the identifying the segment.

12. The computer-implemented method of claim 11, wherein the selecting allows for selecting a single camera view and allows for selecting all camera views.

13. In a digital recorder subsystem, an apparatus for playback of information recorded by the digital recorder subsystem, the apparatus comprising:
   a bus system;
   a communications system communicatively coupled to the bus system;
   a memory coupled to the bus system, wherein the memory includes computer usable program code comprising instructions; and
   a processor unit coupled to the bus system, wherein the processor unit executes the:
   instructions for receiving input from a plurality of data capturing devices of a sensing subsystem of the digital recorder, wherein the input comprises a plurality of video streams from a plurality of video cameras, each of the plurality of video cameras corresponding to one of a plurality of camera views;
   instructions for accessing a video stream recorded by the digital recorder;
   instructions for identifying a segment from the at least one video stream of the plurality of video streams for a restriction;
   instructions for tagging the data segment with a timestamp of when the data segment was captured, and a location of where the data segment was captured, wherein the instructions for tagging further comprises:
      instructions for identifying the data with at least one of a content source information, a timestamp and a global positioning system location;
      instructions for forwarding the identified data to a raw data queue;
   instructions for determining whether the retrieved data is configured; and
   instructions, responsive to determining that the retrieved data is configured, for announcing the retrieved data to a audio and video playback subsystem;
   instructions for recording the identified segment of video in a repository subsystem of the digital recorder;
   instructions, subsequent to recording the identified segment of video in the repository subsystem of the digital recorder, for selecting one of the plurality of camera views for viewing restriction;
   instructions for enabling a restriction for a playback option for the segment of video for the one of the plurality of camera views selected for viewing restriction in response to the data segment being received from a video camera corresponding to the viewing restriction; and
   instructions for generating commands that implement the restriction.

14. In a digital recorder subsystem, the apparatus of claim 13, wherein the processor unit executes the instructions for generating commands further comprising:
   instructions for creating a command selected from a set of commands consisting of at least one of a mark endpoint command, a delete command, a private command, a hidden command, a blur command, and a stop command.

15. In a digital recorder subsystem, the apparatus of claim 13, wherein the processor unit executes the instructions for accessing further comprising:
   instructions for navigating backwards and forwards through the video stream;
   instructions for marking a first video frame in the video stream as a start point of a video segment; and
   instructions for marking a second video frame in the video stream as an endpoint of the video segment.

16. In a digital recorder subsystem, the apparatus of claim 13, wherein the processor unit executes the instructions further comprising instructions for capturing environmental variables, wherein the environmental variable include at least one of a temperature, wind speed, biometric pressure and humidity.

17. In a digital recorder subsystem, the apparatus of claim 13, further comprising a search subsystem that allows selection of data with a selected date and time range.

18. In a digital recorder subsystem, the apparatus of claim 17, wherein the search subsystem uses a structured query language to access data.

19. In a digital recorder subsystem, the apparatus of claim 13, further comprising a screen define subsystem that allows a selection of information, the information including at least one of a video, sound, and temperature sensor.

20. In a digital recorder subsystem, the apparatus of claim 19, wherein the information is stored in a metadata definitions database.

21. In a digital recorder subsystem, the apparatus of claim 20, further comprising a create project subsystem that enables the grouping of information as a project in a project definitions database.

22. In a digital recorder subsystem, the apparatus of claim 13, wherein the processor unit executes the instructions further comprising instructions for selecting a camera view for restriction prior to the identifying the segment.

23. In a digital recorder subsystem, the apparatus of claim 22, wherein the instructions for selecting allows for selecting a single camera view and allows for selecting all camera views.

* * * * *